(12) United States Patent
Gish et al.

(10) Patent No.: US 8,947,549 B2
(45) Date of Patent: Feb. 3, 2015

(54) SPECTRAL SYNTHESIS FOR IMAGE CAPTURING DEVICE PROCESSING

(71) Applicant: Dolby Laboratories Licensing Corporation, San Francisco, CA (US)

(72) Inventors: Walter Gish, Oak Park, CA (US); David Ruhoff, Marina del Rey, CA (US); Jon S. McElvain, Manhattan Beach, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/007,633

(22) PCT Filed: Dec. 20, 2012

(86) PCT No.: PCT/US2012/070837
§ 371 (c)(1),
(2) Date: Sep. 25, 2013

(87) PCT Pub. No.: WO2013/101639
PCT Pub. Date: Jul. 4, 2013

(65) Prior Publication Data
US 2014/0300752 A1    Oct. 9, 2014

Related U.S. Application Data

(60) Provisional application No. 61/581,051, filed on Dec. 28, 2011, provisional application No. 61/581,048, filed on Dec. 28, 2011, provisional application No. 61/733,551, filed on Dec. 5, 2012.

(51) Int. Cl.
*H04N 5/228* (2006.01)
*H04N 9/73* (2006.01)
(Continued)

(52) U.S. Cl.
CPC ............... *H04N 9/646* (2013.01); *H04N 1/60* (2013.01); *H04N 9/735* (2013.01); *H04N 9/643* (2013.01); *H04N 17/002* (2013.01); *H04N 17/02* (2013.01)
USPC ...................... 348/218.1; 348/223.1; 348/577

(58) Field of Classification Search
USPC ........................................................ 348/218.1
See application file for complete search history.

(56) References Cited

U.S. PATENT DOCUMENTS

| 3,267,266 A | 8/1966 | Mori |
| 5,668,596 A | 9/1997 | Vogel |

(Continued)

FOREIGN PATENT DOCUMENTS

| CN | 101640803 | 2/2010 |
| EP | 1450302 | 8/2004 |

(Continued)

OTHER PUBLICATIONS

Thornton, W., "Toward a More Accurate and Extensible Colorimetry. Part VI. Improved Weighting Functions. Preliminary Results," John Wiley & Sons, Inc., Color Research and Application, vol. 24, Issue 4, Aug. 1998.

(Continued)

*Primary Examiner* — Jefferey Harold
*Assistant Examiner* — Michael Teitelbaum

(57) ABSTRACT

A substantially rectangular spectral representation is synthesized, which is adapted to produce image capture device sensor outputs if applied to an image capture device. The synthesized substantially rectangular spectral representation can be utilized in generating output color values of an output color space from image capture device sensor outputs, where the image capture device sensor outputs correspond to an image captured by an image capture device. The generated output color values correspond to colors perceived by the human visual system for the same image as that captured by the image capture device. Image capture device gamut is also determined.

7 Claims, 17 Drawing Sheets

(51) Int. Cl.
  *H04N 5/14* (2006.01)
  *H04N 9/64* (2006.01)
  *H04N 1/60* (2006.01)
  *H04N 17/00* (2006.01)
  *H04N 17/02* (2006.01)

(56) References Cited

U.S. PATENT DOCUMENTS

| | | | |
|---|---|---|---|
| 6,198,512 B1 | 3/2001 | Harris | |
| 6,211,971 B1 | 4/2001 | Specht | |
| 6,243,420 B1 | 6/2001 | Mitchell | |
| 6,549,653 B1 | 4/2003 | Osawa | |
| 6,760,475 B1 | 7/2004 | Miller | |
| 6,771,400 B2 | 8/2004 | Kleiman | |
| 6,816,284 B1 | 11/2004 | Hill | |
| 6,879,716 B1 | 4/2005 | Ishibashi | |
| 6,954,547 B2 | 10/2005 | Matsushiro | |
| 7,035,457 B2 | 4/2006 | Ishibashi | |
| 7,081,925 B2 | 7/2006 | Yang | |
| 7,148,996 B2 | 12/2006 | Yeo | |
| 7,224,845 B1 | 5/2007 | Russo | |
| 7,593,567 B2 | 9/2009 | Chang | |
| 7,612,914 B2 | 11/2009 | Ito | |
| 7,663,668 B2 | 2/2010 | Kuno | |
| 7,835,002 B2 | 11/2010 | Muhammed | |
| 7,884,968 B2 | 2/2011 | Kleiman | |
| 8,031,938 B2 | 10/2011 | Edge | |
| 8,203,712 B2 | 6/2012 | Edge | |
| 8,203,756 B2 | 6/2012 | Edge | |
| 8,223,336 B2 | 7/2012 | Edge | |
| 8,358,318 B2 | 1/2013 | Edge | |
| 8,401,289 B2 | 3/2013 | Edge | |
| 8,458,236 B2 | 6/2013 | Sudhakar | |
| 2003/0048263 A1 | 3/2003 | Wolters | |
| 2004/0130630 A1* | 7/2004 | Ostromek | 348/218.1 |
| 2005/0031199 A1* | 2/2005 | Ben-Chorin et al. | 382/162 |
| 2005/0094887 A1 | 5/2005 | Cakir | |
| 2005/0157190 A1 | 7/2005 | Ostromek | |
| 2007/0247402 A1 | 10/2007 | Delacour | |
| 2008/0298684 A1 | 12/2008 | Lundgren | |
| 2009/0096895 A1 | 4/2009 | Benezra | |
| 2009/0128649 A1 | 5/2009 | Osorio | |
| 2009/0141970 A1 | 6/2009 | Tin | |
| 2010/0118047 A1 | 5/2010 | Ajito | |
| 2011/0025703 A1 | 2/2011 | Edge | |
| 2011/0026027 A1 | 2/2011 | Edge | |
| 2011/0026028 A1 | 2/2011 | Edge | |
| 2011/0026052 A1 | 2/2011 | Edge | |
| 2011/0026817 A1 | 2/2011 | Edge | |
| 2011/0026821 A1 | 2/2011 | Edge | |
| 2011/0211077 A1* | 9/2011 | Nayar et al. | 348/207.1 |

FOREIGN PATENT DOCUMENTS

| | | |
|---|---|---|
| JP | 11-154220 | 6/1999 |
| JP | 2000-171301 | 6/2000 |
| JP | 2001-119586 | 4/2001 |
| JP | 2001-119587 | 4/2001 |
| JP | 2001-144972 | 5/2001 |
| JP | 2001-251645 | 9/2001 |
| JP | 2001-251646 | 9/2001 |
| JP | 2006-304255 | 11/2006 |
| WO | 03/081530 | 10/2003 |
| WO | 2008/067472 | 6/2008 |
| WO | 2011/018749 | 2/2011 |
| WO | 2011/026167 | 3/2011 |

OTHER PUBLICATIONS

Thornton, W., "Spectral Sensitivities of the Normal Human Visual System, Color Matching Functions and Their Principles, and how and Why the Two Sets Should Coincide," John Wiley & Sons, Inc., vol. 24, Issue 2, Apr. 1999.
Martinez-Verdu, F. et al, "Calculation of the Color Matching Functions of Digital Cameras from Their Complete Spectral Sensitivities," IS&T—The Society for Imaging Science and Technology, Journal of Imaging Science and Technology, 2002.
MacAdam, D. et al, "The Theory of the Maximum Visual Efficiency of Colored Materials," Journal of the Optical Society of America, vol. 25, 1935.
Logvinenko, A., "An Object-Color Space," Journal of Vision, vol. 9, Issue 11, pp. 1-23, 2009.
Godau, C. et al, "The Logvinenko Object Color Atlas in Practice," Color Research and Application, vol. 37, Issue 2, Aug. 16, 2011.
Perales, E. et al, "A New Algorithm for Calculating the MacAdam Limits for Any Luminance Factor, Hue Angle and Illuminant," 10th Congress of the International Colour Association AIC Colour, May 8, 2005.
Shimano, N., "Iluminant Invariant Recovery of Surface Reflectances and Estimatio of Colormetric Values from Image Signals," Optical Review, vol. 4, Issue 3, May 1, 1997.
wikipedia.org/wiki/Multispectral_image, retrieved Dec. 6, 2011.
Wyszecki, G. et al, "Color Science: Concepts and Methods, Quantitative Data and Formulae," Wiley-Interscience, 2002, pp. 187-188.
Parmar, M. et al, "A Database of High Dynamic Range Visible and Near-infrared Multispectral Images", Proc. IS&T/SPIE Electronic Imaging, Digital Photography IV, 2008.
wikipedia.org/wiki/CIE_1931_color_space, retrieved Nov. 29, 2011.
Ramanath, R. et al, "Color Image Processing Pipeline. A General Survey of Digital Still Camera Processing," IEEE Signal Processing Magazine, vol. 22, Issue 1, pp. 34-43, 2005.
wikipedia.org/wiki/Bayer_filter, retrieved Dec. 6, 2011.
wikipedia.org/wiki/White_balance, retrieved Dec. 6, 2011.
Takeyuki, A. et al, "Color Conversion Method for Multiprimary Display Using Matrix Switching," Optical Review Spring, Berlin, Germany, vol. 8, Issue 3, pp. 191-197, May 1, 2001.
Nakaya, F. et al, "Applying LabRGB to Real Multi-Spectral Images," 16th Color Imaging Conference: Color Science and Engineering Systems, Technologies and Applications, Final Program and Proceedings, Society for Imaging Science and Technology, pp. 289-294, 2008.
Pujol, Jaume et al, "High Dynamic Range Multispectral System for Wide Color Gamut Measurements," CGIV 3rd European Confeence on Colour Graphics, Imaging, and Vision, Final Program and Proceedings, 2006.
Conde-Acevedo, J.C, et al, "Conversion of a set of Multi-Spectral Images to an RGB System," Revisita Mexicana de Fisica, 2000, vol. 46, Issue 1, pp. 45-51, 2000.
Imai, F. et al, "High-Resolution Multi-Spectral Image Archives: A Hybrid Approach," 6th Color Imaging Conference; Color Science, Systems, and Applications, pp. 224-227, 1998.
Haefliger, J. et al, "High Resolution Multi-Spectral Imaging System for Improved Color Acquisition and Reproduction," Proceedings of SPIE, Spectral Imaging: Instrumentation, Applications and Analysis, vol. 3920, pp. 40-47, 2000.
Jiang, X. et al, "Illuminant Estimation for Multi-Channel Images," Proceedings for th SPIE, Color Imaging X: Processing, Hardcopy, and Applications, vol. 5667, pp. 118-127, 2005.

* cited by examiner

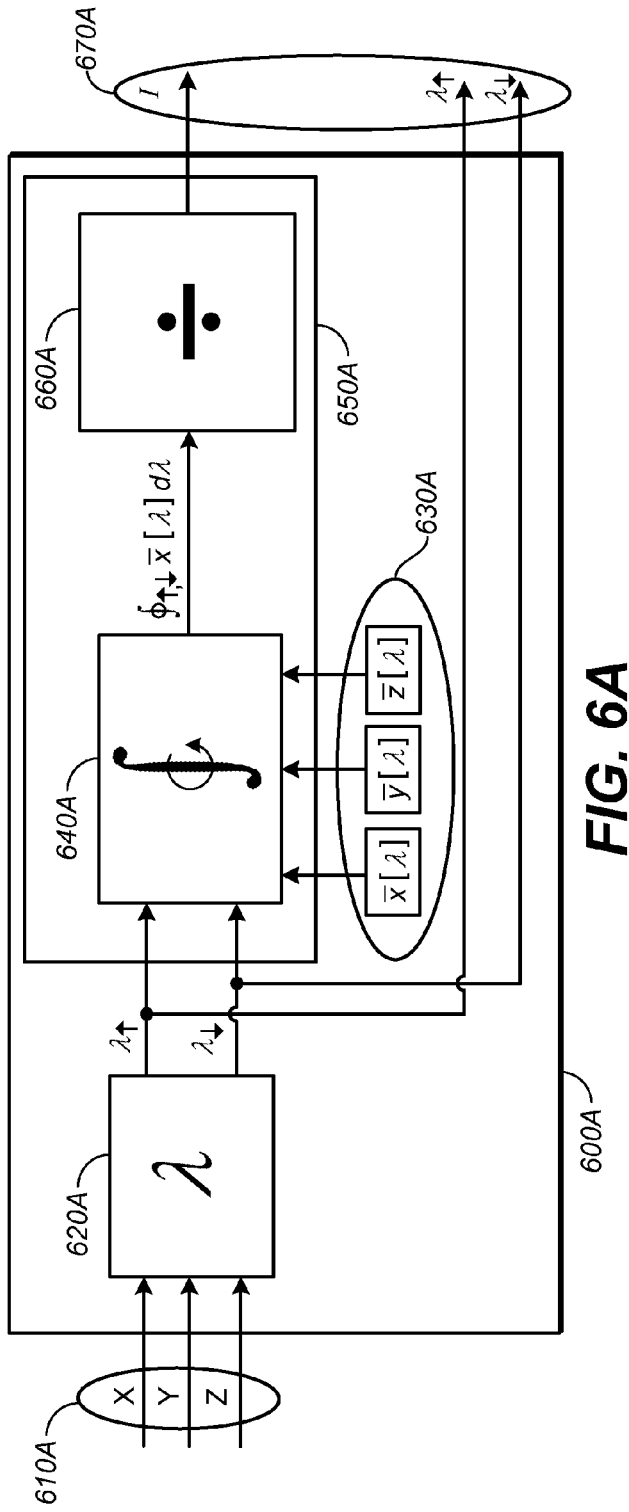
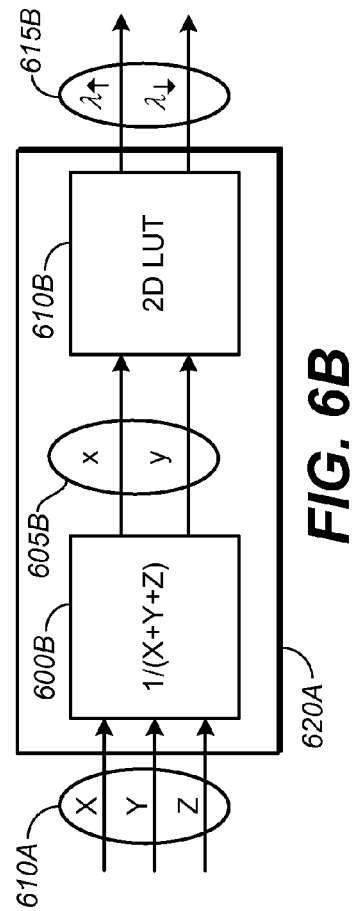
*FIG. 6A*
*FIG. 6B*

8,947,549 B2

SPECTRAL SYNTHESIS FOR IMAGE CAPTURING DEVICE PROCESSING

CROSS REFERENCE TO RELATED APPLICATIONS

This application claims the benefit of priority to U.S. Provisional Patent Application Ser. No. 61/581,051 filed on Dec. 28, 2011, U.S. Provisional Patent Application Ser. No. 61/581,048 filed on Dec. 28, 2011, and U.S. Provisional Patent Application Ser. No. 61/733,551 filed on Dec. 5, 2012, all hereby incorporated by reference in their entirety.

TECHNICAL FIELD OF THE INVENTION

The present disclosure relates to color processing for image capture devices. More particularly, an embodiment of the present invention relates to processing methods to achieve accurate color output from image capture devices.

BACKGROUND OF THE INVENTION

As used herein, the phrases "spectral synthesis" and "spectral synthesis for image capture device processing" may relate to processing methods that may be performed or computed to achieve accurate color output, e.g., from image capture devices. Tristimulus color processing models, such as RGB (red, green, blue), are commonplace. While RGB and other tristimulus models suffice for color identification, matching, and classification, such models may be inherently limited in relation to color processing. By its nature, light comprises a spectrum of electromagnetic energy, which generally cannot be represented completely by, for instance, a red, a green, and a blue color value. With RGB based information as well as tristimulus values corresponding to cone cells receptive to short, medium, and long wavelength light (e.g., blue, green, and red), the human visual system (HVS) attempts to infer an original, natural stimulus.

Multi-spectral systems typically capture, process, and display multi-spectral images. Multi-spectral cameras for example may output more than three channels. Output channels can be rendered with a multi-primary printer or display. Some multi-spectral systems are designed to render a print output with a reflectance spectrum that is nearly identical to a reflectance spectrum of an original object. Multi-spectral representations of images generally fall into two classes. The more common class measures intensity or reflectance over smaller intervals in wavelength, which generally necessitates use of more than three channels (e.g., more than channels R, G, and B) (see reference [1], incorporated herein by reference in its entirety). The less common class uses the Wyszecki hypothesis (see reference [2], incorporated herein by reference in its entirety) which characterizes reflectance spectra as being comprised of two components, a fundamental component which captures a perceptually relevant tristimulus representation plus a residual component which represents the gross features of the overall reflectance spectrum. Wyszecki labeled this residual component the metameric black. An example of this second class is the LabPQR color space. In the LabPQR representation, the tristimulus portion is the Lab color space while PQR represents the residual. For emissive rendering and presentation of images using electronic displays, reflectance spectra identity is not crucial.

A picture produced by a camera or other image capture device is generally not quite the same as what would be perceived by human eyes.

Processing inside an image capture device generally involves a 3×3 matrix that transforms sensor outputs into a color space of an output image. Results of applying this matrix transformation generally do not reproduce what would be perceived by human eyes unless spectral sensitivities of the image capture device's sensors can be represented as a linear combination of color matching functions. In many cases, magnitude of these errors in the results is not inconsequential.

Existing DSLR (digital single-lens reflex) cameras, for instance, may have a knob to select a different 3×3 matrix for different types of scenes (e.g., night, sports, cloudy, portrait, etc.). However, in practice, getting the color right in general and also, for instance, for certain memory colors, such as face (skin) tones, can be problematic.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 6A depicts a spectral synthesis module in accordance with the present disclosure.

FIG. 6B depicts a wavelength determination module in accordance with the present disclosure.

DESCRIPTION OF EXAMPLE EMBODIMENTS

Figure 1A:
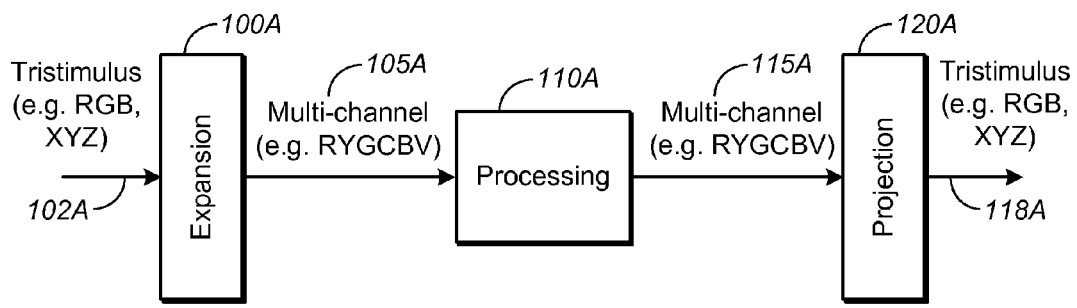
FIG. 1A depicts a spectral image processing method in accordance with an embodiment of the present disclosure.

In an example embodiment of the disclosure, a method for synthesizing a substantially rectangular spectral representation based on a plurality of image capture device sensor outputs is presented, the plurality of image capture device sensor outputs being a result of an input spectrum of an image adapted to be captured by an image capture device, the method comprising: providing the plurality of image capture device sensor outputs, wherein each image capture device sensor output is associated with a corresponding image capture device spectral sensitivity; determining a first wavelength and a second wavelength of the substantially rectangular spectral representation based on the plurality of image capture device sensor outputs; and computing a scale factor based on any one of the image capture device sensor outputs and its corresponding image capture device spectral sensitivity to synthesize the substantially rectangular spectral representation based on the plurality of image capture device sensor outputs, wherein: the synthesized substantially rectangular spectral representation is adapted to produce the plurality of image capture device sensor outputs if applied to the image capture device, and the first wavelength comprises a wavelength where the substantially rectangular spectral representation transitions from zero to the scale factor and the second wavelength comprises a wavelength where the substantially rectangular spectral representation transitions from the scale factor to zero.

In an example embodiment of the disclosure, a method for generating output color values of an output color space from a plurality of image capture device sensor outputs is presented, the plurality of image capture device sensor outputs being a result of an input spectrum of an image captured by an image capture device, the method comprising: providing color matching functions associated with the output color space; providing the plurality of image capture device sensor outputs; synthesizing a spectral representation based on the plurality of image capture device sensor outputs, wherein the synthesized spectral representation is adapted to produce the plurality of image capture device sensor outputs if applied to the image capture device; and applying the synthesized spectral representation to the color matching functions to obtain the output color values.

In an example embodiment of the disclosure, a method for determining gamut of an image capture device is presented, the method comprising: simulating exposure of a cube to the image capture device, wherein: the cube comprises a representation in a rectangular space of substantially rectangular spectra characterized by three dimensions, wherein a first dimension spans possible values of a first wavelength, a second dimension spans possible values of a second wavelength, and a third dimension spans possible values of a scale factor, each point in the cube corresponds to an input substantially rectangular spectrum, and each input substantially rectangular spectrum is characterized by an input scale factor, an input first wavelength, and an input second wavelength, wherein the input first wavelength comprises a wavelength where the input spectrum transitions from zero to the input scale factor and the input second wavelength comprises a wavelength where the input spectrum transitions from the input scale factor to zero; synthesizing an output spectral representation characterized by an output scale factor, an output first wavelength, and an output second wavelength, wherein the output first wavelength comprises a wavelength where the output spectral representation transitions from zero to the output scale factor and the output second wavelength comprises a wavelength where the output spectral representation transitions from the output scale factor to zero; and determining a set of substantially rectangular spectra from among the substantially rectangular spectra represented by the cube for which: the output scale factor is equal to the input scale factor, the output first wavelength is equal to the input first wavelength, and the output second wavelength is equal to the input second wavelength, wherein the determined set of substantially rectangular spectra constitutes the gamut of the image capture device.

In an example embodiment of the disclosure, a system configured to synthesize a substantially rectangular spectral representation based on a plurality of image capture device sensor outputs is presented, the plurality of image capture device sensor outputs being a result of an input spectrum of an image adapted to be captured by an image capture device, wherein each image capture device sensor output is associated with a corresponding image capture device spectral sensitivity, the system comprising: a wavelength determination module that is configured to determine a first wavelength and a second wavelength of the substantially rectangular spectral representation based on the plurality of image capture device sensor outputs; and a scale factor computation module that is configured to compute a scale factor based on any one of the image capture device sensor outputs and its corresponding image capture device spectral sensitivity, wherein: the synthesized spectral representation is adapted to produce the plurality of image capture device sensor outputs if applied to the image capture device, and the first wavelength comprises a wavelength where the substantially rectangular spectral representation transitions from zero to the scale factor and the second wavelength comprises a wavelength where the substantially rectangular spectral representation transitions from the scale factor to zero.

In an example embodiment of the disclosure, a system configured to generate output color values of an output color space from a plurality of image capture device sensor outputs is presented, the plurality of image capture device sensor outputs being a result of an input spectrum of an image adapted to be captured by an image capture device, wherein the output color space is associated with color matching functions, the system comprising: a spectral synthesis module that is configured to synthesize a spectral representation based on the plurality of image capture device sensor outputs, wherein the synthesized spectral representation is adapted to produce the plurality of image capture device sensor outputs if applied to the image capture device; and a spectral application module that is configured to apply the synthesized spectral representation to the color matching functions to generate the output color values.

In an example embodiment of the disclosure, a system configured to determine gamut of an image capture device is presented, the system comprising: an exposure simulation module configured to simulate exposure of a cube to the image capture device, wherein: the cube comprises a representation in a rectangular space of substantially rectangular spectra characterized by three dimensions, wherein a first dimension spans possible values of a first wavelength, a second dimension spans possible values of a second wavelength, and a third dimension spans possible values of a scale factor, each point in the cube corresponds to an input substantially rectangular spectrum, and each input substantially rectangular spectrum is characterized by an input scale factor, an input first wavelength, and an input second wavelength, wherein the input first wavelength comprises a wavelength where the input spectrum transitions from zero to the input scale factor and the input second wavelength comprises a wavelength where the input spectrum transitions from the input scale factor to zero; a spectral synthesis module that is configured to synthesize an output spectral representation, wherein the output spectral representation is characterized by an output scale factor, an output first wavelength, and an output second wavelength, wherein the output first wavelength comprises a wavelength where the output spectral representation transitions from zero to the output scale factor and the output second wavelength comprises a wavelength where the output spectral representation transitions from the output scale factor to zero; and a comparison module that is configured to determine a set of substantially rectangular spectra from among the substantially rectangular spectra represented by the cube for which: the output scale factor is equal to the input scale factor, the output first wavelength is equal to the input first wavelength, and the output second wavelength is equal to the input second wavelength, wherein the determined set of substantially rectangular spectra constitutes the gamut of the image capture device.

Tristimulus-based systems and spectral or multi-spectral systems may be largely incompatible and practiced by separate enterprises. The present disclosure bridges that gap between the tristimulus-based systems and spectral or multi-spectral systems and describes methods for transforming from a tristimulus domain into a spectral domain. These transformations enable application of spectral and multi-spectral image processing methods to tristimulus image data.

As used herein, the term "image capture device" may refer to any device adapted to form an image. The image capture device captures visual information in the form of still or moving pictures. Image information (e.g., image size, image resolution, file format, and so forth) associated with such images may also be stored. Processing of stored information may also be performed. Such image capture devices may include cameras and/or line-scan cameras, flatbed scanners, and other such devices.

As used herein, the term "synthesis" may refer to generation of a signal based on the combination of entities that comprise parameters and/or functions. According to the present disclosure, synthesis of a spectral representation based on color values or image capture device sensor outputs is provided.

As used herein, the terms "actual color" and "correct color" are used interchangeably and are defined herein to mean color perceived by the human visual system.

As used herein, the term "module" may refer to a unit configured to perform certain functions. Modules may be implemented in hardware, software, firmware or combination thereof.

Section 1

Figure 1B:
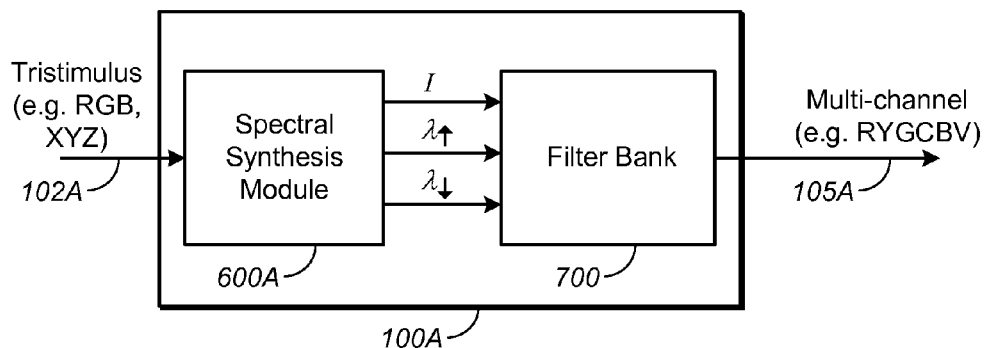
FIG. 1B depicts a spectral expansion module.
Figure 1C:
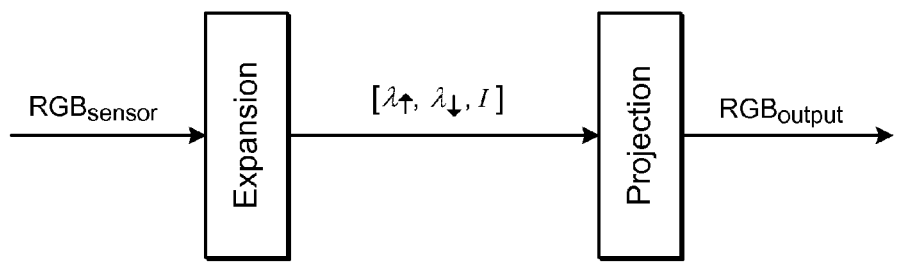
FIG. 1C depicts a manipulation of image capture device color sensor outputs in accordance with an embodiment of the present disclosure.

FIG. 1A depicts an image processing method in accordance with an embodiment of the present disclosure. FIG. 1B depicts the expansion module of FIG. 1A, comprising a spectral synthesis module (600A) followed by a filter bank (700). As depicted in FIG. 1C, processing may not necessarily occur within an image capture device. In such case, there may only be expansion into a substantially rectangular representation followed by projection into an original domain in order to present accurate colors (explained further in section 2).

Referring now to FIG. 1A, a tristimulus representation of color values, for example, RGB (red, green, blue), resulting from an input spectrum are first expanded to a six-basis color representation RYGCBV (red, yellow, green, cyan, blue, violet). This choice for the number of primaries is partially reinforced by statistical analysis of a large database of real-world object reflectances. In this case, it is shown that 99% of the statistical variation of the reflectance dataset can be described by as few as 6 basis vectors (see reference [3], incorporated herein by reference in its entirety). The image can then be processed in the RYGCBV domain. Following processing, the RYGCBV representation of the processed image can then be projected back onto the original RGB domain. It should be noted that, although the RGB and RYGCBV color spaces are considered in the present discussion, color spaces such as YUV, YCbCr, HSV, CMYK and other color spaces known by a person skilled in the art can also be considered.

By way of example, and not limitation, the input (102A) and output (118A) may also be XYZ tristimulus values. By way of example, and not limitation, the expanded representations (105A, 115A) may comprise a number of values other than 6, such as 31 if the visible spectrum is considered as ranging from 400 nm to 700 nm in 10 nm increments. Other possibilities include using a 7 color representation (ROYGCBV) or a 10 color representation. A 6 color representation is useful because it provides a balance between accuracy and computational complexity.

Expanding RGB or XYZ values may not result in a unique spectral expansion because of metamerism (a phenomenon where two different input spectra can result in the same RGB color values). However, as long as a chosen spectral representation, if applied to analysis functions (discussed in greater detail below) corresponding to RGB or XYZ values, would result in the RGB or XYZ values resulting from the input spectrum, accurate color representation relative to actual color can be preserved.

Any given color is a spectrum of light. Such spectrum may be approximately represented according to the equation given below:

$$S[\lambda] \cong \hat{S}[\lambda] = \sum_{i}^{N} C_i B_i[\lambda]$$

wherein $S[\lambda]$ represents an input spectrum, $\hat{S}[\lambda]$ represents an approximate representation, $C_i$ represents an i-th color output value, $B_i[\lambda]$ represents an i-th basis function, and N represents the number of basis functions. For example, an approximate RGB representation can be expressed by the equation $$\hat{S}[\lambda] = C_R B_R[\lambda] + C_G B_G[\lambda] + C_B B_B[\lambda].$$

The basis functions are generally defined functions. For the CIE (International Commission on Illumination) 1931 color space (a mathematically defined color space created by the CIE in 1931; see reference [4], incorporated herein by reference in its entirety), the basis functions are narrowband with peaks at 435.8, 546.1, and 700 nanometers. For displays, the basis functions are the spectral emissions.

Basis functions are associated with matching analysis functions $A_i[\lambda]$, which can be used to determine color output values $C_i$ according to the following equation:

$$C_i = S[\lambda] \cdot A_i[\lambda] = \int_{\lambda=360}^{\lambda=810} S[\lambda] A_i[\lambda]\, d\lambda$$

where the matching analysis functions and basis functions are related according to the equation:

$$A_i[\lambda] \bullet B_j[\lambda] = \delta_{ij}$$

and the limits of integration at 360 nm and 810 nm represent lower ($\lambda_{min}$) and upper ($\lambda_{max}$) limits of wavelengths of visible light.

The preceding equations can also be generalized for other analysis functions (e.g. can be expanded to include infrared and/or ultraviolet). While the equations above indicate orthogonal basis functions, other basis functions can be used as well. By way of example and not of limitation, basis functions could be orthogonal with respect to a matrix. Although generally not likely, it should be noted that an analysis function can be identical to its corresponding basis function. Analysis functions have meaning as well. For CIE 1931 color space, they are spectral matching functions. Analysis functions can also be spectral sensitivities of an image capture device or eye spectral sensitivities.

An embodiment of the present disclosure utilizes substantially rectangular spectra similar to those proposed by MacAdam to generate a new representation of a given color using, for instance, six basis colors RYGCBV.

Figure 2:
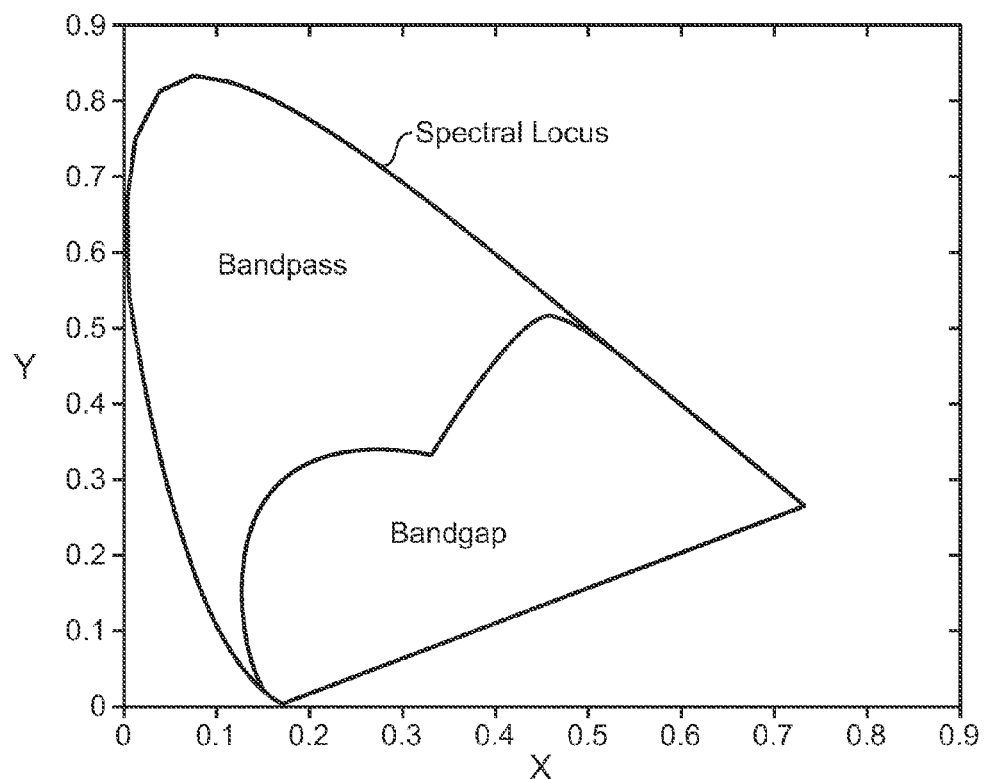
FIG. 2 depicts (x, y) chromaticity space divided into rectangular band-pass and band-gap spectra.

MacAdam formalized a spectral representation for "maximum efficiency" reflectance spectra (see reference [5], incorporated herein by reference in its entirety). These spectra have the property that, for any desired hue and saturation, the efficiency (i.e., reflected luminance) is maximized. Such spectra can be interpreted as "optimal ink". This family of spectra is complete—any possible chromaticity can be represented. MacAdam characterized these reflectance spectra as having binary values, 0 and 1, and two transition wavelengths, $\lambda_\uparrow$ for a 0→1 transition and $\lambda_\downarrow$ for a 1→0 transition. This gives rise to band-pass and band-gap spectra, which occupy the (x, y) chromaticity domain as depicted in FIG. 2.

Although MacAdam viewed these rectangular spectra as pure reflectance spectra, it is possible to extend them for a general spectral representation of light by introducing a scale factor I:

$$S_{rect}[\lambda; \lambda_\uparrow, \lambda_\downarrow, I] = \begin{cases} I, & \text{if } \lambda_\uparrow \leq \lambda_\downarrow \text{ and } (\lambda \geq \lambda_\uparrow \text{ and } \lambda \leq \lambda_\downarrow) \\ I, & \text{if } \lambda_\uparrow > \lambda_\downarrow \text{ and } (\lambda \geq \lambda_\uparrow \text{ or } \lambda \leq \lambda_\downarrow) \\ 0, & \text{otherwise} \end{cases}$$

The three-parameter rectangular spectrum is adequate for representing all possible perceivable colors. However, real objects generally cannot be represented completely by rectangular spectra. Real objects tend to reflect or transmit some light at all wavelengths, even though reflectance may be dominant over a more limited range of wavelengths. This can be largely accounted for by adding an additional parameter, which represents a low value for the rectangular spectrum. This can be written as a four-parameter rectangular spectrum:

$$S_{4,rect}[\lambda; \lambda_\uparrow, \lambda_\downarrow, I_h, I_l] = \begin{cases} I_h, & \text{if } \lambda_\uparrow \leq \lambda_\downarrow \text{ and } (\lambda \geq \lambda_\uparrow \text{ and } \lambda \leq \lambda_\downarrow) \\ I_h, & \text{if } \lambda_\uparrow > \lambda_\downarrow \text{ and } (\lambda \geq \lambda_\uparrow \text{ or } \lambda \leq \lambda_\downarrow) \\ I_l, & \text{otherwise} \end{cases}$$

Figure 3:
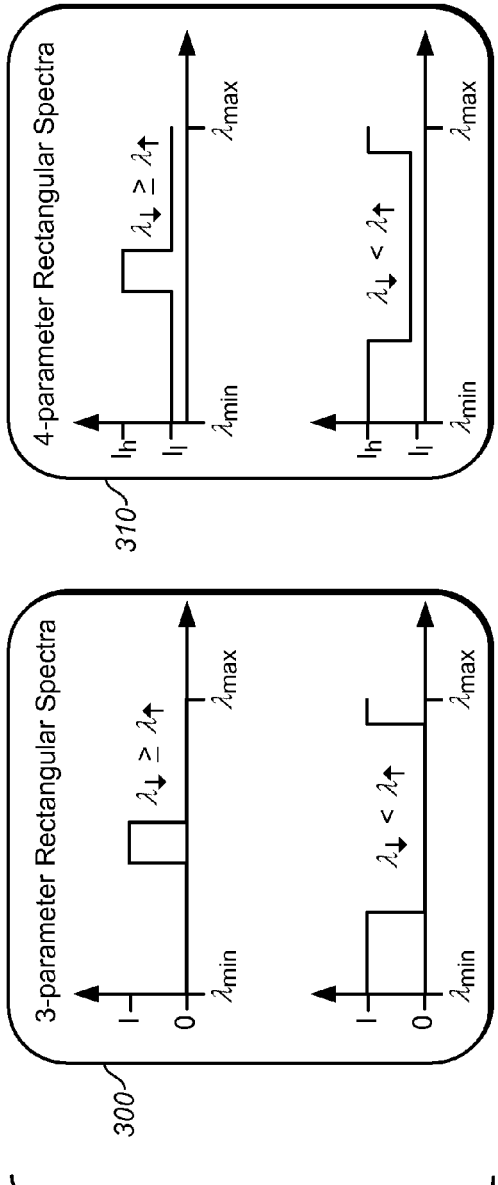
FIG. 3 depicts three-parameter and four-parameter rectangular spectral representations.

It should be noted that the three-parameter rectangular spectrum can be represented as a four-parameter rectangular spectrum with the low value $I_l$ set to 0. Spectral diagrams for both the three-parameter and four-parameter rectangular spectral representations are depicted in FIG. 3. Further discussion of the properties of rectangular spectra is given in Table A, which forms an integral part of the present disclosure.

Figure 4:
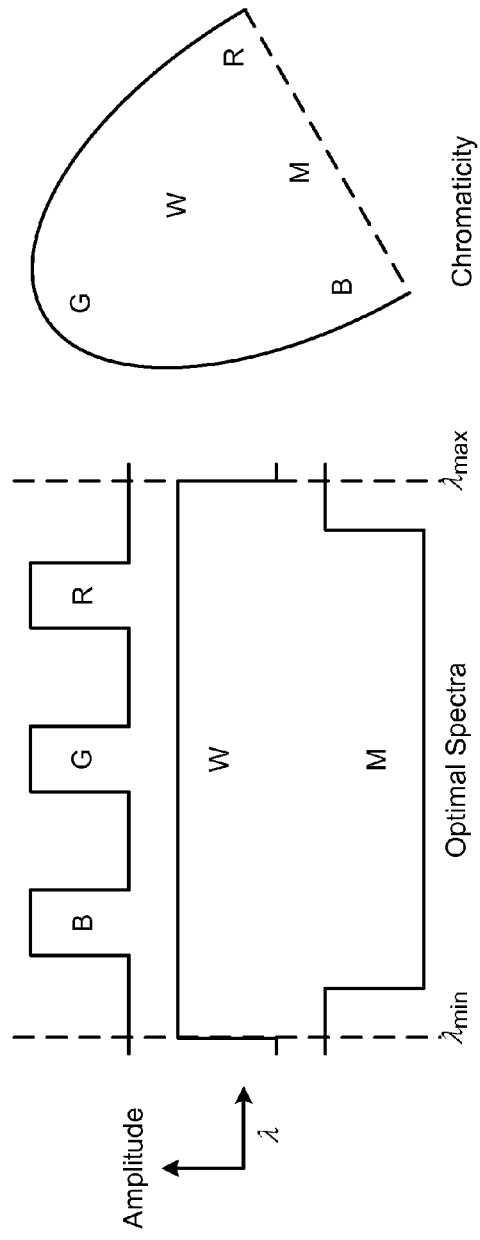
FIG. 4 depicts colors represented in both a rectangular spectrum in the $\lambda$ domain as well as in chromaticity space.

A given color represented by (x, y) coordinates in chromaticity space can be represented as a rectangular bandpass or bandgap spectrum (see FIG. 4). Alternatively, the $[\lambda_{min}, \lambda_{max}]$ domain (the wavelengths of visible light) itself can be interpreted as circular, allowing all spectra to have a band-pass form. In such a case, what were formerly band-gap spectra become band-pass spectra that cross the $\lambda_{min}/\lambda_{max}$ point (see FIGS. 5A-5C). The highlighted portions of the circular domains depicted in FIGS. 5B and 5C indicate wavelengths at which the value of the rectangular spectrum is equal to the scale factor I.

Figure 18:
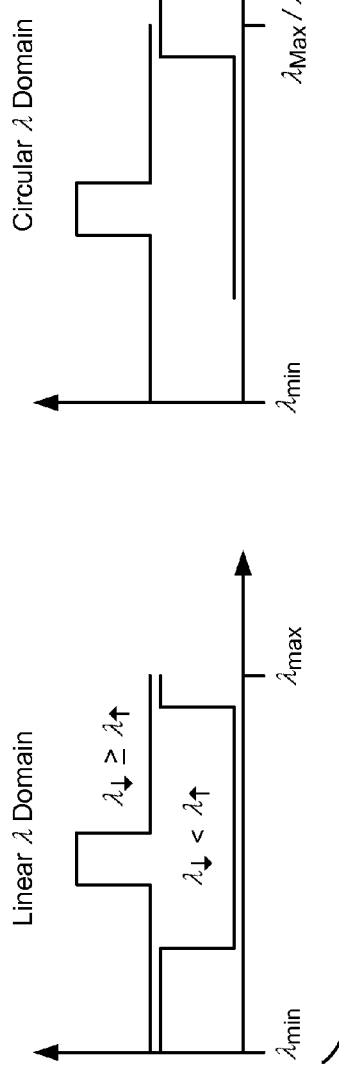
FIG. 18 depicts band-pass and band-gap spectra in both linear and circular wavelength domains.

Interpretation of the $[\lambda_{min}, \lambda_{max}]$ domain as circular resulting in all spectra having a band-pass form is also depicted in FIG. 18, explained further in Table A.

In order to perform spectral expansion on a set of original tristimulus values (which can be from any color space) from an image to be processed, chromaticity coordinates are first used to compute $\lambda_\uparrow$ and $\lambda_\downarrow$. The scale factor, I, is then derived from $\lambda_\uparrow$, $\lambda_\downarrow$ and the original tristimulus values.

FIG. 6A depicts a spectral synthesis module (600A) that can be utilized in the image processing method depicted in FIG. 1A (specifically, used as part of the expansion depicted in FIG. 1B). XYZ tristimulus values (610A) are input into a wavelength determination module (620A, depicted in detail in FIG. 6B) to determine the transition wavelengths (615B) $\lambda_\uparrow$ and $\lambda_\downarrow$. The computations can involve computing (600B) values x and y (605B) based on the XYZ tristimulus values (610A):

$$x = \frac{X}{X+Y+Z}$$
$$y = \frac{Y}{X+Y+Z}.$$

A two-dimensional lookup table (2D-LUT, 610B) can then be utilized to map the values x and y to determine the transition wavelengths (615B) $\lambda_\uparrow$ and $\lambda_\downarrow$. Based on these transition wavelengths $\lambda_\uparrow$ and $\lambda_\downarrow$, the scale factor I can be determined by a scale factor computation module (650A) comprised of a circular integration module (640A) and a division module (660A). The circular integration module (640A) can perform circular integration of any one of the spectral analysis functions $[\overline{x}[\lambda], \overline{y}[\lambda], \overline{z}[\lambda]]$ (630A) over an interval defined by the transition wavelengths $\lambda_\uparrow$ and $\lambda_\downarrow$. By way of example, and not limitation, FIG. 6A depicts circular integration of $\overline{x}[\lambda]$. A person skilled in the art can understand that $\overline{y}[\lambda]$ or $\overline{z}[\lambda]$ any combination of the spectral analysis functions can be used for performing circular integration as well. A result of the circular integration module (640A) is then provided to the division module (660A) to produce a scale factor I. Specifically, the scale factor I can be given by the following equation:

$$I = \frac{X}{\int_{\uparrow,\downarrow} \overline{x}[\lambda]d\lambda} = \frac{Y}{\int_{\uparrow,\downarrow} \overline{y}[\lambda]d\lambda} = \frac{Z}{\int_{\uparrow,\downarrow} \overline{z}[\lambda]d\lambda}.$$

These integrals can be computed, for instance, with two table look-ups and addition/subtraction operations. In this manner, the three parameters of the rectangular spectrum [$\lambda_\uparrow$, $\lambda_\downarrow$, I] (670) are determined to synthesize the rectangular spectrum.

Figure 7:
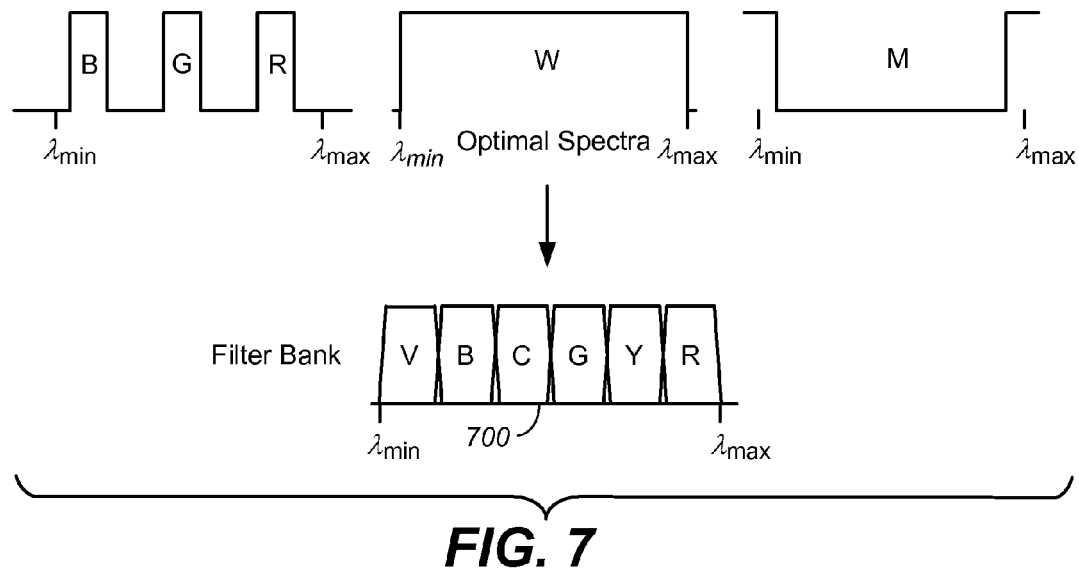
FIG. 7 depicts a rectangular representation of RGB (red, green, blue) basis colors, white, magenta, and a RYGCBV (red, yellow, green, cyan, blue, violet) filter bank.

As depicted in FIG. 7, a synthesized rectangular spectrum can be filtered (the filter banks can but need not be equal in bandwidth) to produce RYGCBV color values. At this point, image processing may be performed on the RYGCBV color values.

According to several embodiments of the present disclosure, a class of processing operations applicable to both tristimulus and spectral or multi-spectral representations is described. For traditional RGB data associated with an image, there are two common mathematical operations: multiplication by a 3×3 matrix and independent non-linear transformation of the individual RGB channels. Matrix multiplication is commonly used to adjust color and/or the effects of the illuminant. Non-linear transformation is often referred to as tone-mapping because the non-linear transformation alters visual tone (brightness and contrast) of the image. Note that any number of 3×3 matrix multiplications can be collapsed into a single 3×3 matrix multiplication and that similarly any number of one dimensional (1D) transformations of each of the RGB channels can similarly be collapsed into just one non-linear transformation for each of those three channels. Thus, an image can be processed through a set of three non-linear transformations, one for each channel associated with the image, followed by a matrix multiplication.

For example, even with only the traditional three RGB channels, a transformation as specified above comprising performing non-linear transformation followed by matrix multiplication can accurately encapsulate the differences between the image formats common today, which possess limited intensity range and color, to potential future formats possessing larger intensity range (often called dynamic range) and color gamut.

This class of transformations can be generalized to a multi-spectral case for any number of color channels through the following relation:

$O_i = M_{ij} T_j [I_j]$ $i, j = 1, \ldots, N$ where $I_j$ denotes a j-th input color channel value (e.g., R, G, or B in an RGB representation or R, Y, G, C, B, or V, in an RYGCBV representation), $T_j$ denotes non-linear transformation applied to $I_j$, $M_{ij}$ denotes an N×N matrix, and $O_i$ denotes an i-th output color channel value.

The spectral image processing method discussed above can be applied to spectral color correction. In practice, primary color correction can be applied through modifications directly to the RGB channels independently. While these modifications can account for primary manipulations that will need to be performed, it is difficult to manipulate specific hues only. For example, it is difficult to make a yellow hue more intense without modifying R and G (the adjacent colors) or B (reducing blue has the effect of directly increasing yellow). Fundamentally, this is because three color channels are sufficient to match a given color, but insufficient for hue control as there are four fundamental hues perceptually, red vs. green and blue vs. yellow, as described by opponent color theory.

Figure 8:
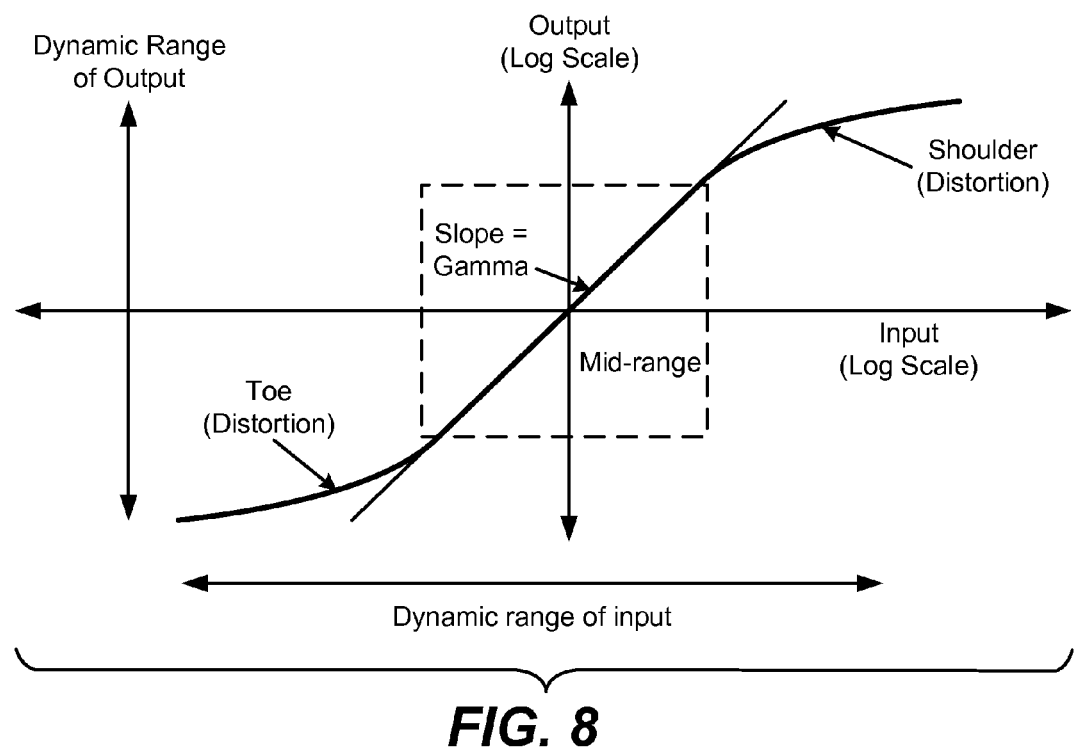
FIG. 8 depicts a sigmoid mapping curve relating input and output color intensities.

In practice, this can be handled by secondary color correction. Secondary color correction transforms the RGB data into an HSL (hue-saturation-luminance) representation and modifies HSL values conditionally over a specified range of hue-saturation-luminance values. Since yellow is half-way between red and green, cyan is half-way between green and blue, and magenta is half-way between blue and red, secondary color correction is often implemented with 6 hues, RYGCBM, which can be referred to as 6-axis secondary color correction. Primary and global secondary color correction can be integrated in the methods of spectral image processing in accordance with the present disclosure utilizing, for example, RYGCBV color values (note that M is not necessary as it is always a BR mixture, unlike C and Y). A sigmoid tone curve, depicted in FIG. 8, can be modified for adjustment of amplitude, gamma, toe, and shoulder. Re-saturation can be performed by adding white or by spectral broadening.

Section 2

Figure 9:
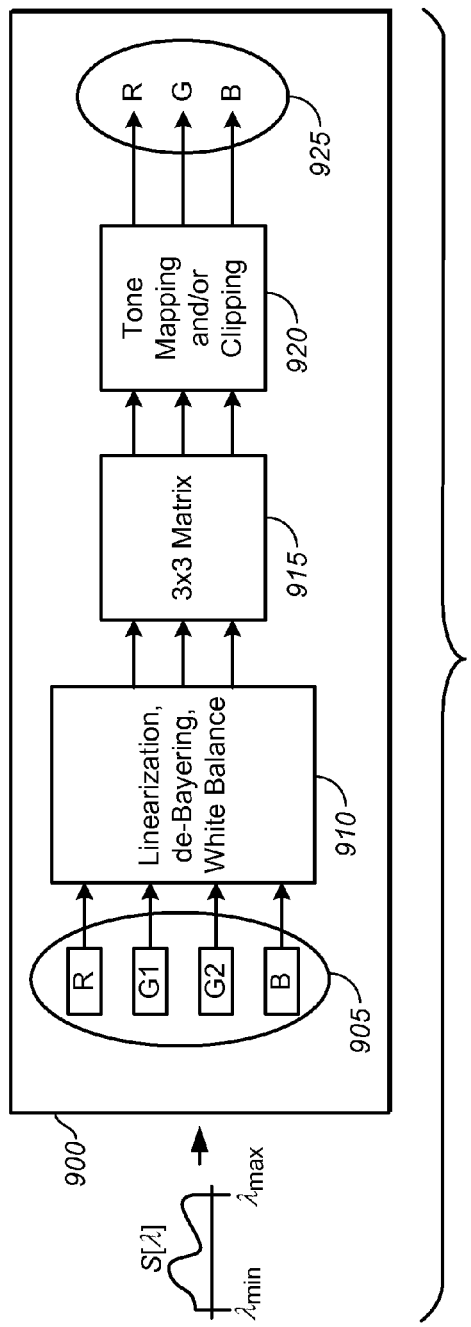
FIG. 9 depicts a digital camera processing method.

According to additional embodiments of the present disclosure, spectral synthesis methods can be applied to image capture device processing. FIG. 9 depicts a processing method performed in modern digital image capture devices (see reference [6], incorporated herein by reference in its entirety). Raw image capture device sensor outputs (905) (e.g., R, G1, G2, and B values) resulting from an input spectrum S[$\lambda$] are first processed (910) according to a method comprising one or more of linearization (if necessary), deBayering (e.g., for single-chip sensors), and white-balancing. A Bayer filter mosaic is a color filter array for arranging RGB color filters on a square grid of photosensors in an image capture device. Obtaining a full-color image involves reversing this process in a step known as deBayering (see reference [7], incorporated herein by reference in its entirety). White-balancing is an adjustment of intensities of primary colors (e.g., red, green, and blue) to correctly render specific colors (see reference [8], incorporated herein by reference in its entirety).

Data obtained from such processing (910) of the raw image capture device sensor outputs (905) are then generally transformed to an output color space (e.g., RGB color space in FIG. 9) by a 3×3 matrix (915). The transformation output can be tone processed and/or clipped (920) to a specific range. The processing performed in each of blocks (910), (915), and (920) yields an output color space (925) from the raw image capture device sensor outputs (905).

According to several embodiments of the present disclosure, image capture device processing methods alternative to the 3×3 matrix are presented. The 3×3 matrix alone may not be sufficient to describe accurate transformation of image capture device sensor outputs to output colors (925).

Figure 10:
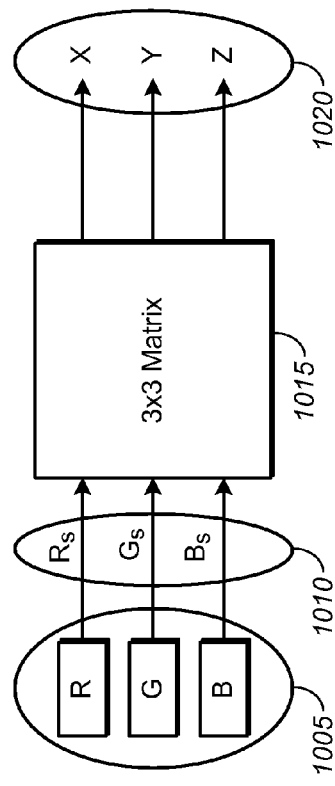
FIG. 10 depicts a simplified digital camera processing method.

In order to focus on the possible issues with this 3×3 matrix (915), consider the simplified configuration depicted in FIG. 10.

For the present discussion, consider an image capture device comprising a red (R), green (G), and blue (B) channels (e.g., RGB is considered an input color space) and consider CIE [X, Y, Z] as an output color space (1020). It should be noted that, although the RGB and CIE color spaces are considered in the present discussion, color spaces such as YUV, YCbCr, HSV, CMYK and other color spaces known by a person skilled in the art can also be considered.

Figure 12:
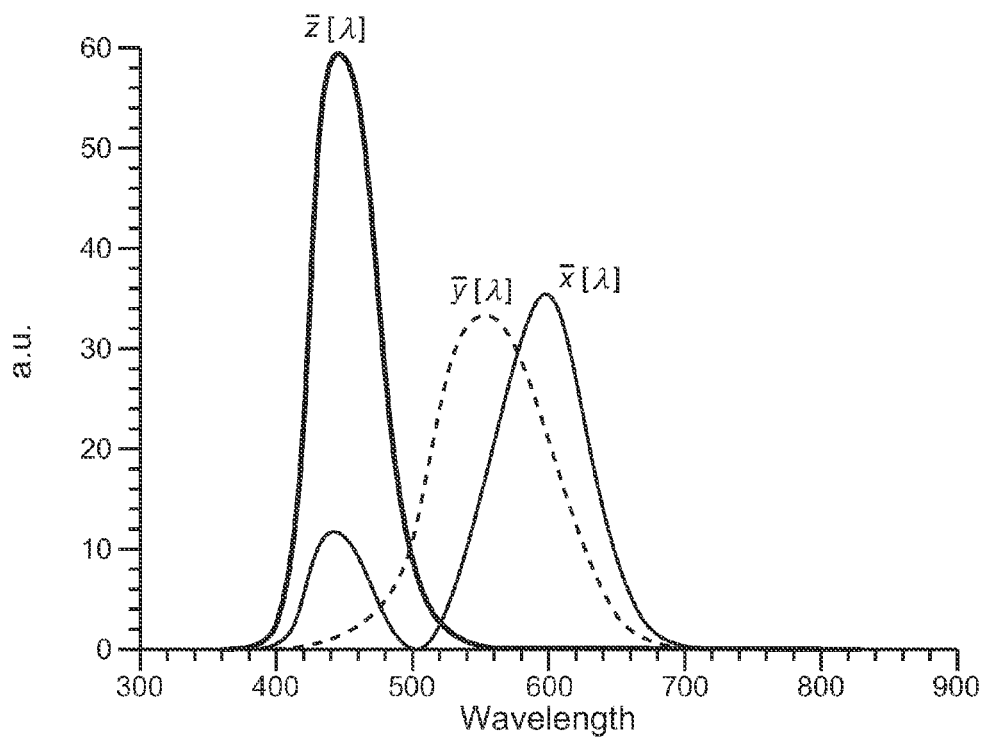
FIG. 12 depicts CIE (International Commission on Illumination) 1931 color matching functions.

Tristimulus values [X, Y, Z] can be determined from an input spectrum S[λ] and color matching functions [$\bar{x}[\lambda]$, $\bar{y}[\lambda]$, $\bar{z}[\lambda]$] defined over an interval [$\lambda_{min}$, $\lambda_{max}$] by the equations $$X = \int_{\lambda_{min}}^{\lambda_{max}} \bar{x}[\lambda] S[\lambda] d\lambda$$

$$Y = \int_{\lambda_{min}}^{\lambda_{max}} \bar{y}[\lambda] S[\lambda] d\lambda$$

$$Z = \int_{\lambda_{min}}^{\lambda_{max}} \bar{y}[\lambda] I[\lambda] d\lambda$$

where the interval [$\lambda_{min}$, $\lambda_{max}$] encompasses wavelengths of light generally perceptible by a human visual system. FIG. 12 depicts an example of such functions as determined by CIE in 1931.

Figure 13:
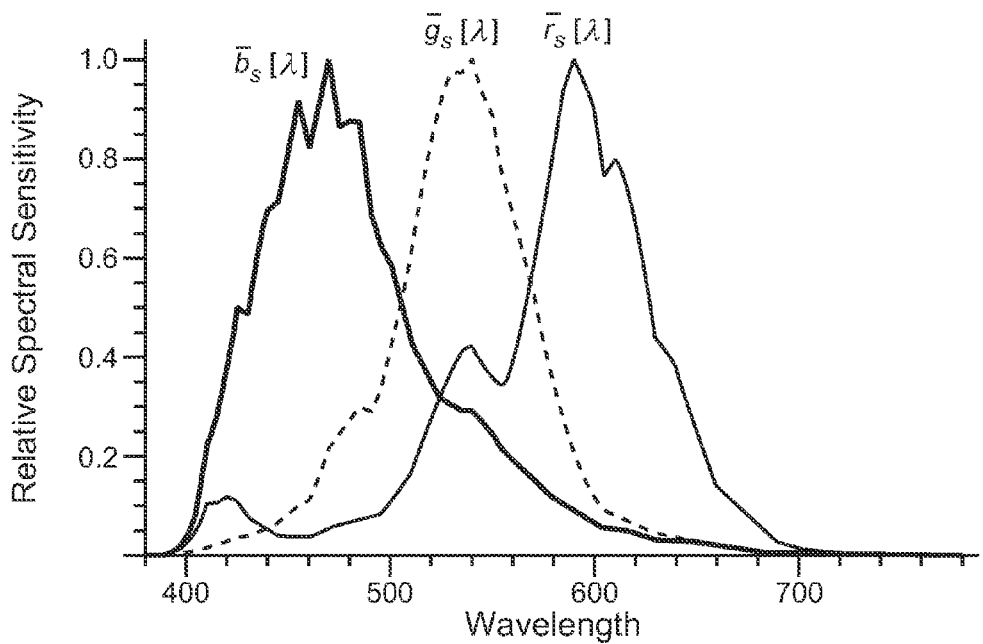
FIG. 13 depicts camera spectral sensitivities for a digital camera.

Similarly, image capture device sensor outputs [$R_S$, $G_S$, $B_S$] (1010) (where the subscript indicates sensor) are determined by image capture device spectral sensitivities [$\bar{r}_S[\lambda]$, $\bar{g}_S[\lambda]$, $\bar{b}_S[\lambda]$] using analogous equations $$R_S = \int_{\lambda_{min}}^{\lambda_{max}} \bar{r}_S[\lambda] S[\lambda] d\lambda$$

$$G_S = \int_{\lambda_{min}}^{\lambda_{max}} \bar{g}_S[\lambda] S[\lambda] d\lambda$$

$$B_S = \int_{\lambda_{min}}^{\lambda_{max}} \bar{b}_S[\lambda] S[\lambda] d\lambda$$

where the image capture device spectral sensitivities represent wavelength response of image capture device color channels. FIG. 13 depicts an example of such functions for an example modern digital camera.

Figure 11:
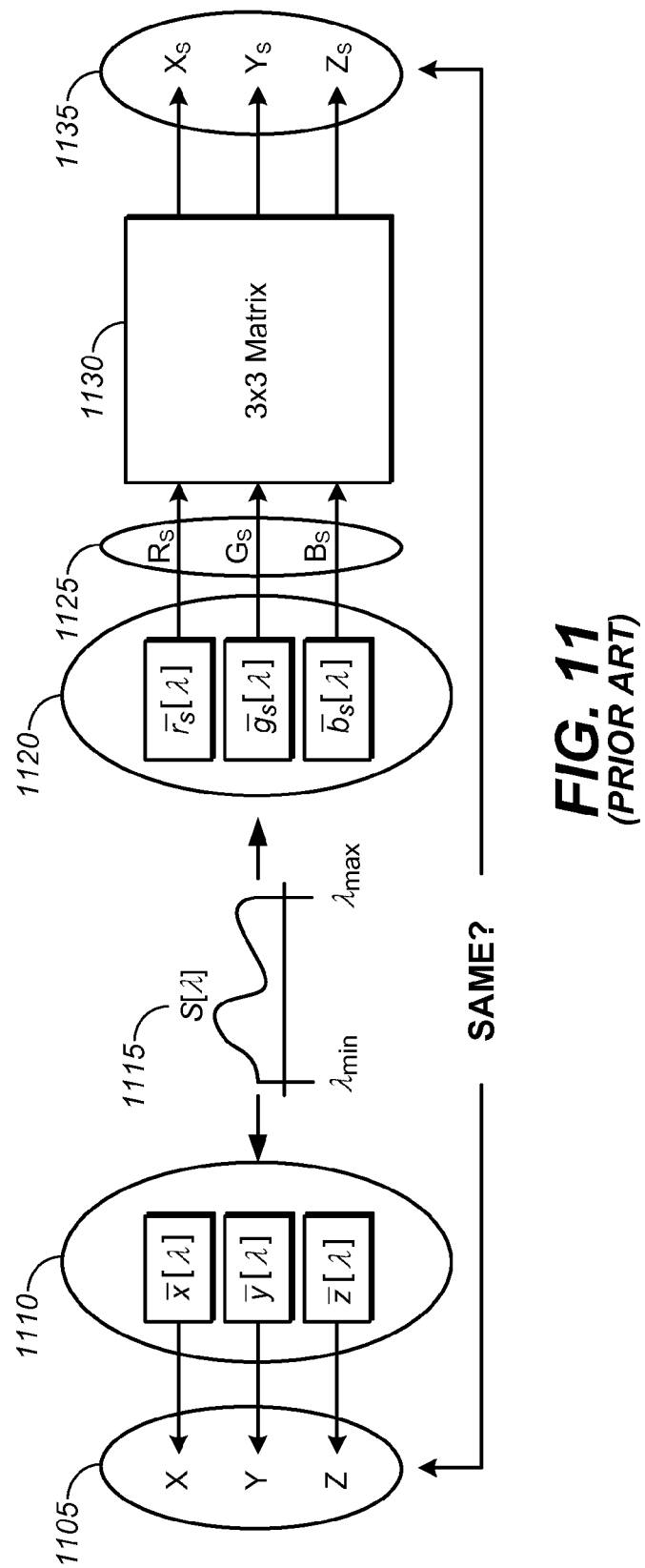
FIG. 11 depicts output colors from a camera and actual colors for comparison.

FIG. 11 depicts that an output color [$X_S$, $Y_S$, $Z_S$] (1135) from the image capture device, obtained through applying a 3×3 matrix transformation (1130) to image capture device sensor outputs [$R_S$, $G_S$, $B_S$] (1125), may not be the same as actual color [X, Y, Z] (1105) perceived by the human visual system. Color accuracy between the output color from the image capture device [$X_S$, $Y_S$, $Z_S$] (1135) and the actual color [X, Y, Z] (1105) can generally be guaranteed only when the image capture device spectral sensitivities [$\bar{r}_S[\lambda]$, $\bar{g}_S[\lambda]$, $\bar{b}_S[\lambda]$] (1120) are an invertible linear combination of color matching functions (1110). Mathematically, this occurs when there exists a 3×3 matrix Q such that $$\begin{bmatrix} \bar{r}_S[\lambda] \\ \bar{g}_S[\lambda] \\ \bar{b}_S[\lambda] \end{bmatrix} = Q \begin{bmatrix} \bar{x}[\lambda] \\ \bar{y}[\lambda] \\ \bar{z}[\lambda] \end{bmatrix}$$

where $Q^{-1}$ exists.

Multiplying the above equation on both sides by the input spectrum S[λ] (1115) and integrating both sides yield the result $$\begin{bmatrix} R_S \\ G_S \\ B_S \end{bmatrix} = Q \begin{bmatrix} X \\ Y \\ Z \end{bmatrix}.$$

It follows that $$\begin{bmatrix} X \\ Y \\ Z \end{bmatrix} = Q^{-1} \begin{bmatrix} R_S \\ G_S \\ B_S \end{bmatrix}.$$

With reference back to FIG. 11, to obtain the actual color [X, Y, Z] (1105) directly, ideally the image capture device spectral sensitivities [$\bar{r}_S[\lambda]$, $\bar{g}_S[\lambda]$, $\bar{b}_S[\lambda]$] (1120) should be identical to the color matching functions [$\bar{x}[\lambda]$, $\bar{y}[\lambda]$, $\bar{z}[\lambda]$] (1110). If these ideal spectral sensitivities (which equal the color matching functions) are modified by a matrix Q to produce the actual image capture device spectral sensitivities, then such modification can be undone (e.g., by transforming the image capture device sensor outputs (1125) with $Q^{-1}$) to produce the actual color [X, Y, Z] (1105).

If the relationship between the image capture device spectral sensitivities [$\bar{r}_S[\lambda]$, $\bar{g}_S[\lambda]$, $\bar{b}_S[\lambda]$] (1120) and the color matching functions [$\bar{x}[\lambda]$, $\bar{y}[\lambda]$, $\bar{z}[\lambda]$] (1110) is more complex than a linear transform, a 3×3 matrix may not be sufficient.

Differences between the color matching functions and image capture device spectral sensitivities can be significant. FIG. 12 depicts the CIE (International Commission on Illumination) 1931 color matching functions while FIG. 13 depicts exemplary spectral sensitivities for a modern digital motion picture camera (the ARRI D-21). In 1931, the CIE created a mathematically defined color space known as CIE 1931. The color matching functions of FIG. 12 correspond to this color space (see reference [4], incorporated herein by reference in its entirety). There is no linear combination of color matching functions that would yield the spectral sensitivities for this camera. Specifically, the CIE 1931 color matching functions are smooth, whereas the camera spectral sensitivities are not. Consideration of such camera response, as provided by the camera spectral sensitivities, is generally not taken into account in the sensor to output processing.

Although applying a matrix transform may not be sufficient for transforming the image capture device sensor outputs to the actual color, accurate processing from the image capture device sensor outputs to an output color space can exhibit overall linearity. That is, if $\vec{C}_S$ represents the sensor output [$R_S$, $G_S$, $B_S$], $\vec{C}_{out}$ represents the output color [$X_S$, $Y_S$, $Z_S$], and P[ ] represents processing between the image capture device sensor output and the output color, e.g., $$\vec{C}_{out} = P[\vec{C}_S]$$

then multiplying the input $\vec{C}_S$ by some constant α causes outputs to change by the same factor, $$P[\alpha \vec{C}_S] = \alpha \vec{C}_{out}.$$

However, even when such properties of linearity are exhibited, the processing may not necessarily be by means of applying a matrix exclusively. Such a matrix can be determined by minimizing a particular error metric over a training set of color stimuli. Some recommended procedures for determining a matrix in this manner are described in reference [6], incorporated by reference herein in its entirety.

According to several embodiments of the present disclosure, methods and systems for generating actual color perceived by a human visual system from given image capture device spectral sensitivities are described.

Figure 14A:
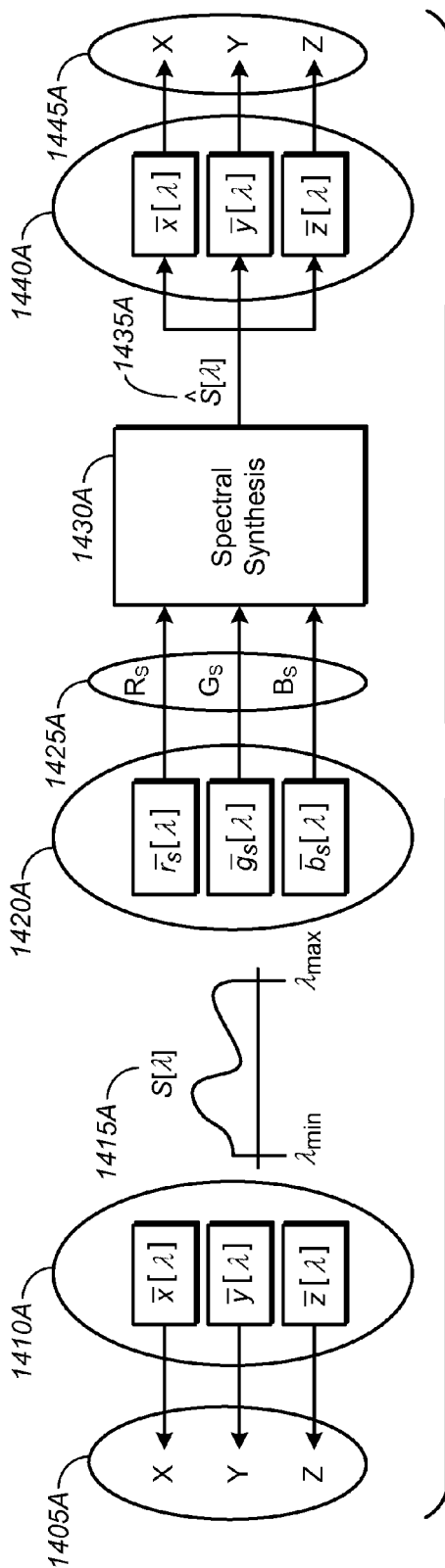
FIG. 14A depicts a method for synthesizing correct color outputs based on image capture device sensor outputs in accordance with an embodiment of the present disclosure.

FIG. 14A depicts an embodiment of a method and system for synthesizing a spectral representation Ŝ[λ] (1435A) that, if applied to the image capture device, can produce the observed image capture device sensor outputs [$R_S$, $G_S$, $B_S$] (1425A). This method can be utilized with negative tristimulus values.

The synthesized spectrum Ŝ[λ] (1435A) can produce the observed image capture device sensor outputs [$R_S$, $G_S$, $B_S$] (1425A) regardless of whether or not the synthesized spectrum Ŝ[λ] (1435A) is an actual spectrum S[λ] (1415A). Specifically, the synthesized spectrum Ŝ[λ] (1435A) can produce the correct [X, Y, Z] (1405A, 1445A).

Once the synthesized spectrum Ŝ[λ] (1435A) has been determined, the correct output color [X, Y, Z] (1405A, 1445A) can be obtained.

Figure 14B:
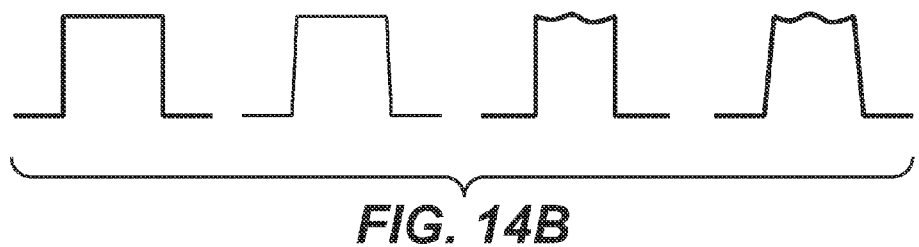
FIGS. 14B-14C depict examples of substantially rectangular spectral representations.
Figure 14C:
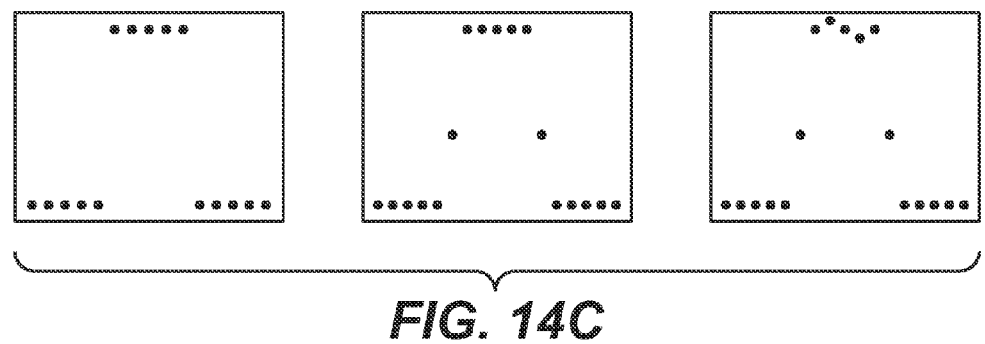

According to several embodiments of the present disclosure, substantially rectangular spectra can be utilized as the synthesized spectrum Ŝ[λ] (1435A). As used in the present disclosure, the term "substantially rectangular" may refer to a shape of a spectrum that may closely approximate a rectangular shape, but is not necessarily exactly rectangular in shape. By way of example and not of limitation, a spectrum characterized by side walls that are not exactly perpendicular to the horizontal (λ) axis can be considered substantially rectangular. By way of further example and not of limitation, a spectrum characterized by a small range of maximum values rather than only one maximum value can also be considered substantially rectangular. Substantially rectangular spectra can be continuous functions or discrete wavelength (sampled) functions. Examples of continuous substantially rectangular spectra and discrete wavelength substantially rectangular spectra are depicted in FIGS. 14B and 14C, respectively.

FIGS. 15A-15D depict an image capture device processing method, in accordance with an embodiment of the present disclosure, using synthesized rectangular spectra.

Figure 15A:
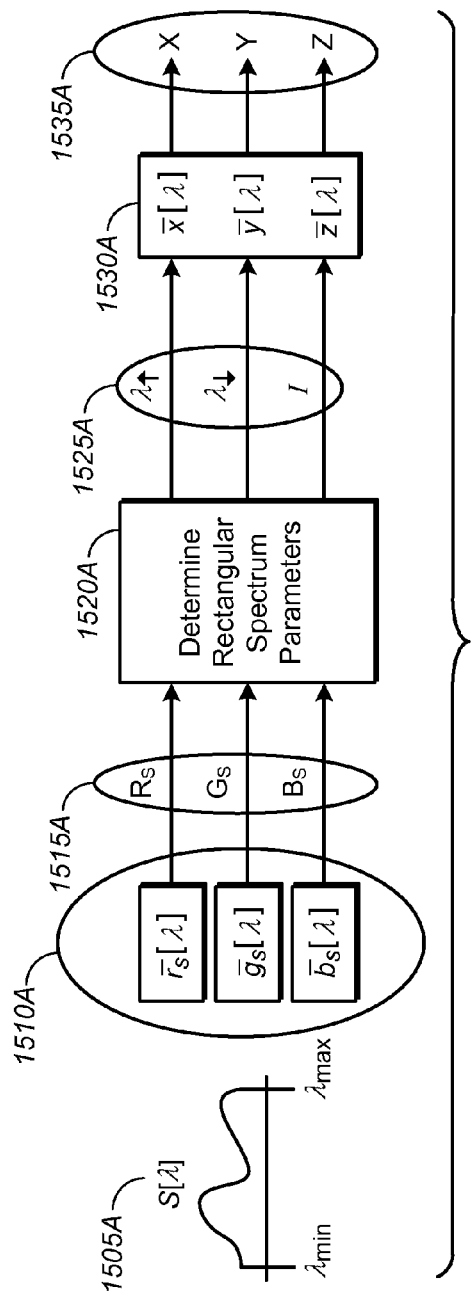
FIGS. 15A-15F depict image capture device processing methods, in accordance with embodiment of the present disclosure, using synthesized substantially rectangular spectra.

FIG. 15A depicts an actual image spectrum S[λ] (1505A) being captured by an image capture device. The actual image spectrum S[λ] (1505A) is applied to the image capture device spectral sensitivities [$\bar{r}_S[\lambda], \bar{g}_S[\lambda], \bar{b}_S[\lambda]$] (1510A) to produce image capture device sensor outputs [$R_S, G_S, B_S$] (1515A). The image capture device sensor outputs [$R_S, G_S, B_S$] (1515A) can be input to a spectral synthesis module (1520A) to generate a spectral representation characterized by rectangular spectral parameters [$\lambda_\uparrow, \lambda_\downarrow, I$] (1525A). The synthesized rectangular spectrum (1525A) is adapted to produce the observed image capture device sensor outputs [$R_S, G_S, B_S$] (1515A) if applied to the image capture device:

$$R_S = I \oiint_{\lambda_\uparrow,\lambda_\downarrow} \bar{r}_S[\lambda]d\lambda$$

$$G_S = I \oiint_{\lambda_\uparrow,\lambda_\downarrow} \bar{g}_S[\lambda]d\lambda$$

$$B_S = I \oiint_{\lambda_\uparrow,\lambda_\downarrow} \bar{b}_S[\lambda]d\lambda$$

where the integration symbol denotes circular integration over the λ domain $$\oiint_{\lambda_\uparrow,\lambda_\downarrow} \equiv \begin{cases} \int_{\lambda_\uparrow}^{\lambda_\downarrow}, & \text{if } \lambda_\uparrow \leq \lambda_\downarrow \\ \int_{\lambda_\uparrow}^{\lambda_{max}} + \int_{\lambda_{min}}^{\lambda_\downarrow}, & \text{otherwise.} \end{cases}$$

The synthesized rectangular spectrum (1525A) can be applied to a spectral application module (1530A) to produce correct color outputs [X, Y, Z] (1535A).

Alternatively, the [$\lambda_{min}, \lambda_{max}$] domain itself can be interpreted as circular, allowing all spectra to have a band-pass form. In such a case, what were formerly band-gap spectra become band-pass spectra that cross the $\lambda_{min}, \lambda_{max}$ point.

Hence, mathematically, the first step is to solve for [$\lambda_\uparrow, \lambda_\downarrow, I$] (1525A) given the image capture device sensor outputs [$R_S$, $G_S, B_S$] (1515A). Once parameters of the rectangular spectrum have been determined, computation of the correct output [X, Y, Z] (1535A) can follow directly:

$$X = I \oiint_{\lambda_\uparrow,\lambda_\downarrow} \bar{x}[\lambda]d\lambda$$

$$Y = I \oiint_{\lambda_\uparrow,\lambda_\downarrow} \bar{y}[\lambda]d\lambda$$

$$Z = I \oiint_{\lambda_\uparrow,\lambda_\downarrow} \bar{z}[\lambda]d\lambda$$

Figure 15B:
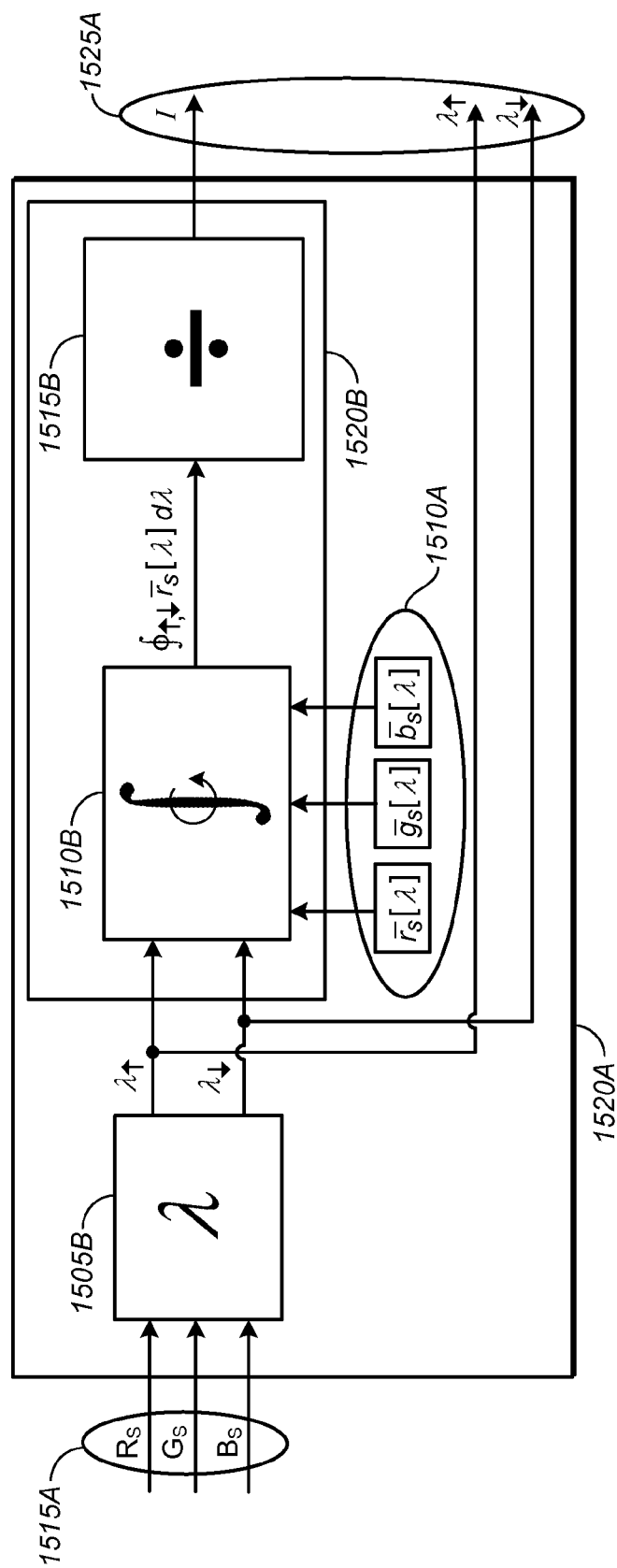
Figure 15C:
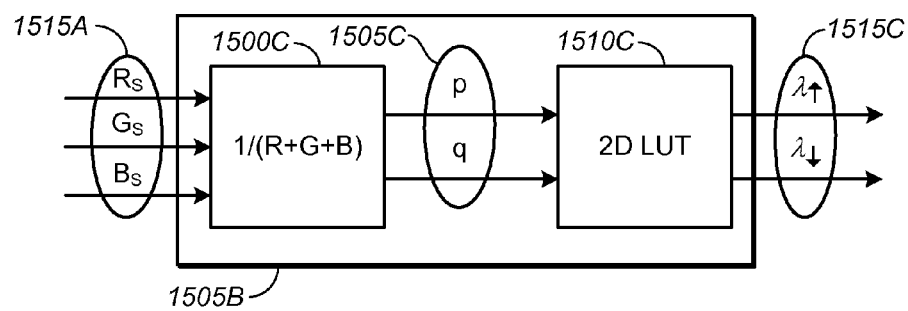
Figure 15D:
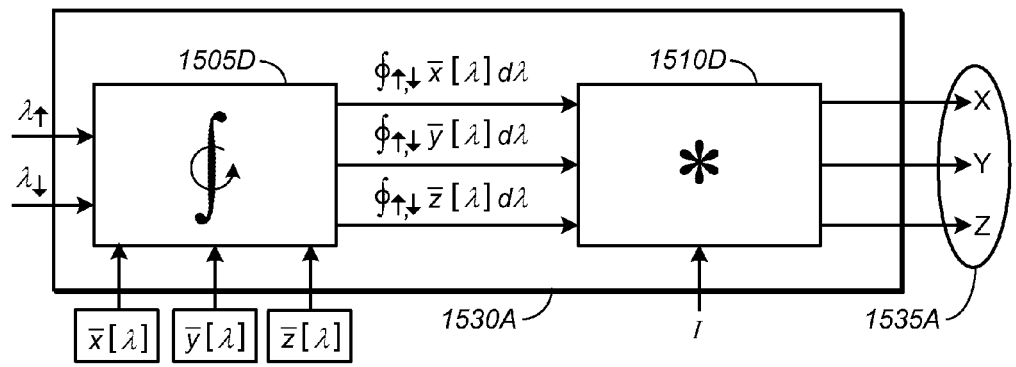

This process is depicted in FIG. 15D. Specifically, the wavelengths $\lambda_\uparrow$ and $\lambda_\downarrow$ in addition to the color matching functions [$\bar{x}[\lambda], \bar{y}[\lambda], \bar{z}[\lambda]$] are sent to a circular integration module (1505D). Results of the integrations are individually multiplied by the scale factor I via a multiplication module (1510D) to generate correct color output values [X, Y, Z] (1535A).

Performance of this process of using a rectangular spectral representation Ŝ[λ] equivalent to the original image's spectral representation S[λ] to obtain correct color output for image capture devices can take any of several forms, each with different complexity and performance.

Figure 16:
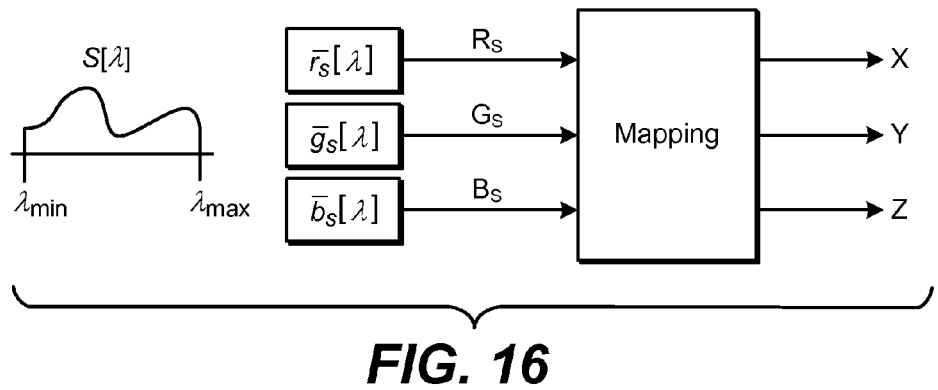
FIG. 16 depicts an example of image capture device processing that is equivalent to a mapping from captured RGB (red, green, blue) values to correct color XYZ (tristimulus values corresponding to CIE 1931 color space) values.

In one embodiment, with reference back to FIG. 15A, a generally computation-intensive implementation can first determine rectangular parameters [$\lambda_\uparrow, \lambda_\downarrow, I$] (1525A) and then produce the output color [X, Y, Z] (1535A) from rectangular spectra characterized by [$\lambda_\uparrow, \lambda_\downarrow, I$] (1525A). Because the number of degrees of freedom (e.g., three in this case) is conserved, this process provides a mapping from [$R_S, G_S, B_S$] to [X, Y, Z] as depicted in FIG. 16.

A three-dimensional look up table (3D-LUT) can be utilized to perform this mapping. It is also possible to perform computations (to be provided below) and then use a 2D-LUT based on the computations to determine the transition wavelengths $\lambda_\uparrow$ and $\lambda_\downarrow$. The transition wavelengths can be then used to determine the scale factor I. This process is depicted in FIG. 15B.

FIG. 15B depicts a spectral synthesis module (1520A) that can be utilized in the image capture device processing method depicted in FIG. 15A. Image capture device sensor outputs [$R_S, G_S, B_S$] (1515A) are input into a wavelength determination module (1505B, depicted in further detail in FIG. 15C) to determine $\lambda_\uparrow$ and $\lambda_\downarrow$. The computations can involve computing (1500C) values p and q (1505C) based on the image capture device sensor outputs [$R_S, G_S, B_S$] (1515A):

$$p = \frac{R_S}{R_S + G_S + B_S}$$

$$q = \frac{G_S}{R_S + G_S + B_S}.$$

A two-dimensional lookup table (2D-LUT, 1510C) can then be utilized to map the values p and q (1505C) to determine the transition wavelengths $\lambda_\uparrow$ and $\lambda_\downarrow$ (1515C). Based on these transition wavelengths $\lambda_\uparrow$ and $\lambda_\downarrow$, the scale factor I can be determined by a scale factor computation module (1520B) comprised of a circular integration module (1510B) and a division module (1515B). The circular integration module (1510B) can perform circular integration of any one of the image capture device spectral sensitivities [$\bar{r}_S[\lambda], \bar{g}_S[\lambda], \bar{b}_S[\lambda]$] (1510A) over an interval defined by the transition wavelengths $\lambda_\uparrow$ and $\lambda_\downarrow$. A result of the circular integration module (1510B) is then provided to the division module (1515B) to produce a scale factor I. Specifically, scale factor I can be given by the following equation:

$$I = \frac{R_S}{\int\!\!\!\int_{\uparrow,\downarrow} \bar{r}_S[\lambda]d\lambda} = \frac{G_S}{\int\!\!\!\int_{\uparrow,\downarrow} \bar{g}_S[\lambda]d\lambda} = \frac{B_S}{\int\!\!\!\int_{\uparrow,\downarrow} \bar{b}_S[\lambda]d\lambda}.$$

These integrals can be computed, for instance, with two table look-ups and addition/subtraction operations.

Figure 15E:
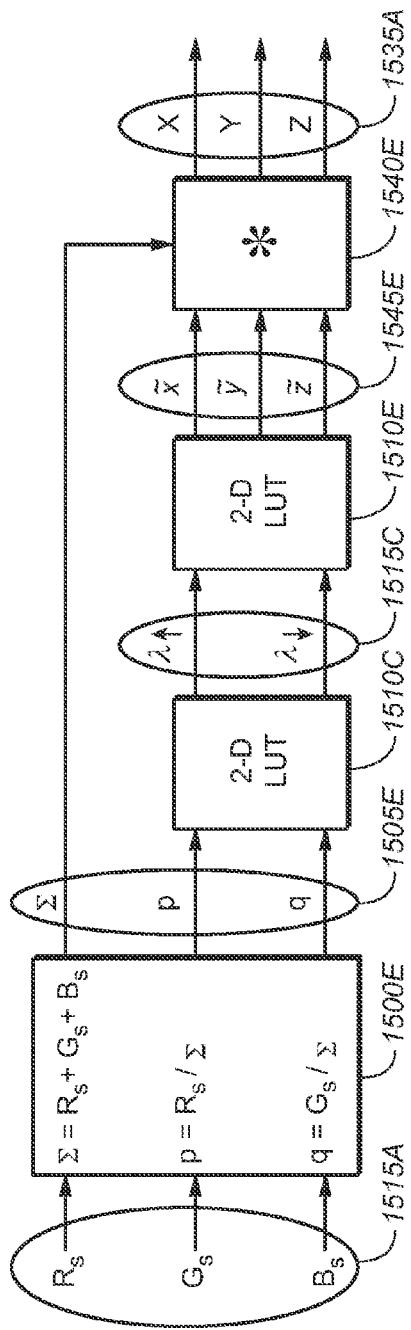

FIG. 15E depicts another embodiment wherein a second 2-D LUT (1510E) is used to replace the circular integrals 1505D and 1510B and the division 1515B. In this embodiment the scale factor I would be $$I = \frac{R_S + G_S + B_S}{\int\!\!\!\int_{\uparrow,\downarrow} [\bar{r}_S(\lambda) + \bar{g}_S(\lambda) + \bar{b}_S(\lambda)]d\lambda}.$$

The numerator of this expression is labeled Σ and sent to the multiplication unit 1540E. The denominator of this is included in the 2-D LUT 1510E. 2-D LUT 1510E contains the un-normalized outputs $[\tilde{X}, \tilde{Y}, \tilde{Z}]$ which are the results of the following calculations as a function of $\lambda_\uparrow, \lambda_\downarrow$:

$$\tilde{X} = \frac{\int\!\!\!\int_{\uparrow,\downarrow} \bar{x}(\lambda)d\lambda}{\int\!\!\!\int_{\uparrow,\downarrow} [\bar{r}_S(\lambda) + \bar{g}_S(\lambda) + \bar{b}_S(\lambda)]d\lambda}$$

$$\tilde{Y} = \frac{\int\!\!\!\int_{\uparrow,\downarrow} \bar{y}(\lambda)d\lambda}{\int\!\!\!\int_{\uparrow,\downarrow} [\bar{r}_S(\lambda) + \bar{g}_S(\lambda) + \bar{b}_S(\lambda)]d\lambda}$$

$$\tilde{Z} = \frac{\int\!\!\!\int_{\uparrow,\downarrow} \bar{z}(\lambda)d\lambda}{\int\!\!\!\int_{\uparrow,\downarrow} [\bar{r}_S(\lambda) + \bar{g}_S(\lambda) + \bar{b}_S(\lambda)]d\lambda}$$

These outputs only need to be multiplied by Σ to produce the final result [X, Y, Z].

Figure 15F:
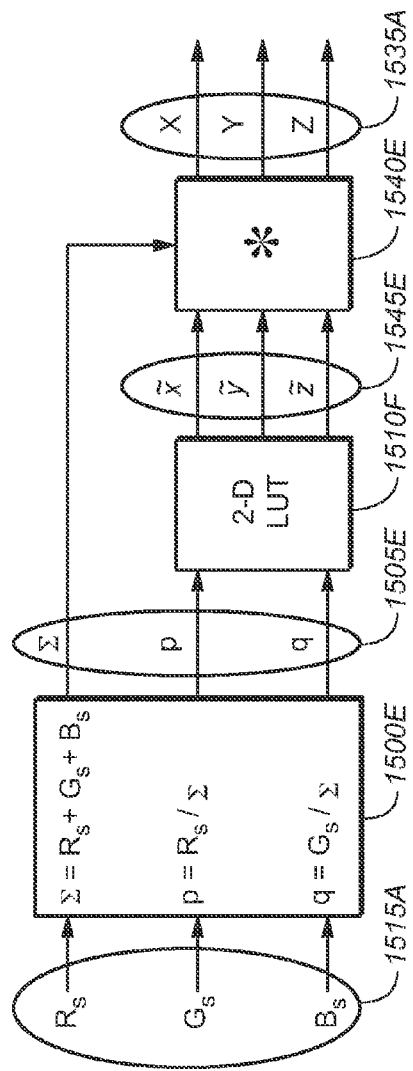

FIG. 15F depicts an example of further simplification. The two 2-D LUTs 1510C and 1510E shown in FIG. 15E can be combined into a single 2-D LUT 1510F. The 2-D LUT 1510F is no larger than 2-D LUT 1510E and it also eliminates any quantization or round-off error due to finite implementations of it inputs $\lambda_\Xi, \lambda_\downarrow$. FIG. 15F is the simplest implementation possible, and therefore often a preferred implementation.

FIG. 15F is also a method for implementing general color modifications that conserve overall linearity as described in paragraph [0080]. The 2-D LUT 1510F can contain the results of the calculations described herein or some other method such as a least-square fit over some chosen training set. For example, in an embodiment, given inputs Σ, p, and q (1505E), one may either compute analytically or measure un-normalized outputs $[\tilde{X}_o, \tilde{Y}_o, \tilde{Z}_o]$. Then, the 2-D LUT 1510F may be constructed so that its output $[\tilde{X}, \tilde{Y}, \tilde{Z}]$ approximates $[\tilde{X}_o, \tilde{Y}_o, \tilde{Z}_o]$ according to a matching or best fit criterion, such as minimizing the mean-square-distance between $[\tilde{X}_o, \tilde{Y}_o, \tilde{Z}_o]$ and $[\tilde{X}, \tilde{Y}, \tilde{Z}]$.

The method of the preceding discussion involving synthesis of a rectangular spectral representation equivalent to the spectral representation of the image captured by the image capture device can be utilized in examining and characterizing image capture device accuracy. With some spectra, this method can result in an output rectangular spectrum which is identical to the input rectangular spectrum for some set of stimuli.

Figure 17:
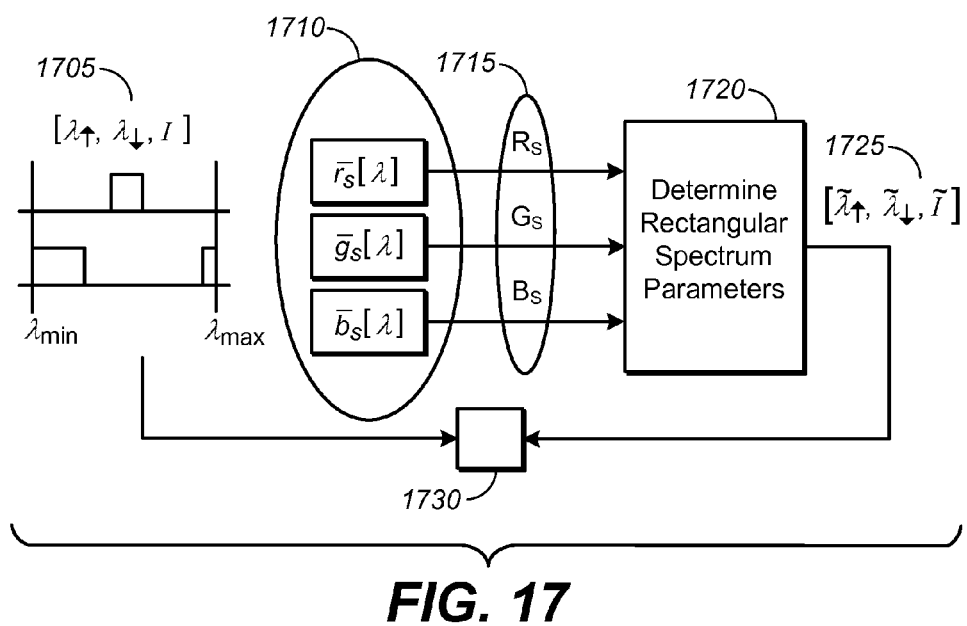
FIG. 17 depicts a method for determining image capture device gamut in accordance with an embodiment of the present disclosure.

According to several embodiments of the present disclosure, a method for determining this set of stimuli is provided as follows. The method can first comprise simulating exposure of a cube in $[\lambda_\uparrow, \lambda_\downarrow, I]$ (1705) to the image capture device's spectral sensitivities $[\bar{r}_S[\lambda], \bar{g}_S[\lambda], \bar{b}_S[\lambda]]$ (1710) to produce simulated image capture device sensor outputs $[R_S, G_S, B_S]$ (1715). The cube (1705) provides a representation of rectangular spectra in rectangular space defined by three dimensions $[\lambda_\uparrow, \lambda_\downarrow, I]$. Specifically, each point in the cube corresponds to a rectangular spectrum, where the rectangular spectrum is characterized by a scale factor I, a first wavelength $\lambda_\uparrow$ being a wavelength where the input spectrum transitions from zero to the scale factor, and a second wavelength $\lambda_\downarrow$ being a wavelength where the input spectrum transitions from the input scale factor to zero. A next step is to determine by comparison (1730) a set of spectra for which an output $[\tilde{\lambda}_\uparrow, \tilde{\lambda}_\downarrow, \tilde{I}]$ (1725) of the previously described spectral synthesis method is the same as the input $[\lambda_\uparrow, \lambda_\downarrow, I]$ (1705) as depicted in FIG. 17. The set of rectangular spectra which can be recovered exactly using this method constitutes an image capture device gamut. Rectangular spectra which cannot be recovered exactly constitute what is commonly referred to as image capture device metamerism.

The examples set forth above are provided to give those of ordinary skill in the art a complete disclosure and description of how to make and use the embodiments of the spectral synthesis for image capture device processing of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable gate array (FPGA)).

A number of embodiments of the disclosure have been described. Nevertheless, it will be understood that various modifications can be made without departing from the spirit and scope of the present disclosure. Accordingly, other embodiments are within the scope of the following claims.

LIST OF REFERENCES

[1] wikipedia.org/wiki/Multispectral_image, retrieved 6 Dec. 2011
[2] Wyszecki, G. and Stiles, W. S., *Color Science: Concepts and Methods, Quantitative Data and Formulae*, Wiley-Interscience, 2002, pp. 187-188.
[3] M. Parmar, et al, "A Database of High Dynamic Range Visible and Near-infrared Multispectral Images", Proc. IS&T/SPIE Electronic Imaging 2008: Digital Photography IV.
[4] wikipedia.org/wild/CIE_1931_color_space, retrieved 29 Nov. 2011.
[5] MacAdam, David L., "The Theory of the Maximum Visual Efficiency of Color Materials," J. Optical Soc. Am., Vol. 25, pp. 249-252, 1935.
[6] "Color Image Processing Pipeline. A General Survey of Digital Still Camera Processing", IEEE Signal Processing Magazine, vol. 22, no. 1, pp. 34-43, 2005.
[7] wikipedia.org/wiki/Bayer_filter, retrieved 6 Dec. 2011
[8] wikipedia.org/wiki/White_balance, retrieved 6 Dec. 2011
[9] Logvinenko, Alexander D., "An Object Color Space", J. Vision. 9(11):5, pp. 1-23, 2009

TABLE A

Rectangular Spectra
Rectangular spectra possess many useful properties:

a) MacAdam efficiency
b) Complete (all possible chromaticity)
c) 3 degrees of freedom
d) Maximally compact spectra The last property, compactness, arises because there are fundamentally two ways to de-saturate any chromaticity: broaden the spectrum or add white. Logvinenko (see reference [9], incorporated herein by reference in its entirety) exploited this property to produce a more general form for the reflective spectra of objects (and also replaced $\lambda_\uparrow$ and $\lambda_\downarrow$ with an equivalent form using the center wavelength and a signed bandwidth where negative bandwidths were used to represent bandgap spectra).

FIG. 2 depicts how the band-pass and band-gap behavior appears in chromaticity space. Note that the boundary between band-pass and band-gap regions has two segments: one segment runs from the equal-energy white point to the maximum wavelength red, and the other segment runs from the white point to the minimum wavelength blue. These are referred to as the white-red boundary and the white-blue boundary, respectively.

Figure 5A:
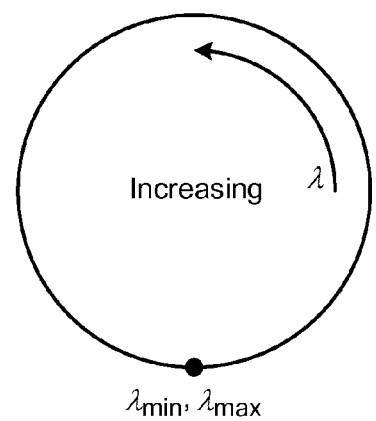
FIGS. 5A-5C depict a circular representation of the $\lambda$ domain.
Figure 5B:
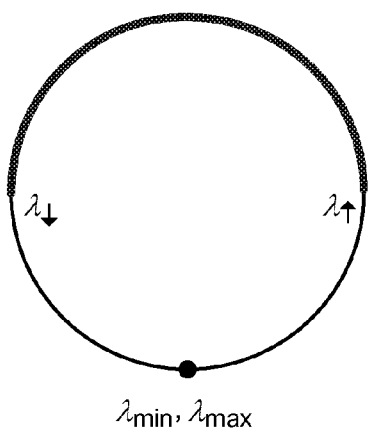
Figure 5C:
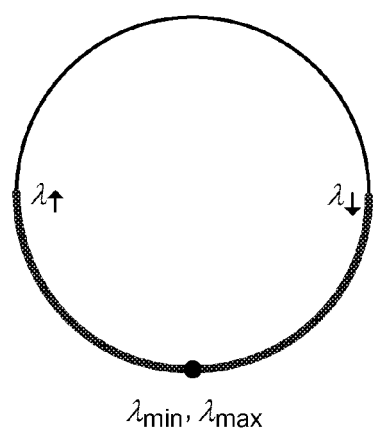

It is possible to use circular integrals to hide the distinction between band-pass and band-gap spectra. This can also be achieved by considering the wavelength domain to be circular, also eliminating the distinction between band-pass and band-gap spectra. FIGS. 5A-5C depict this circular domain over which the integrals are evaluated. Specifically, FIG. 5A depicts the circular wavelength domain, FIG. 5B depicts a band-pass rectangular spectrum, and FIG. 5C depicts a band-gap rectangular spectrum.

Note that $\lambda_{min}$ and $\lambda_{max}$ are the same point in the circular representation and that $\lambda$ increases in the counter-clockwise direction. In the circular representation the integral is always from $\lambda_\uparrow$ to $\lambda_\downarrow$ and the solution is always band-pass as depicted in FIG. 18. An alternative visualization of this would be to draw these spectra on the outside of a tube so that $\lambda_{min}$ and $\lambda_{max}$ can be the same point.

Figure 19:
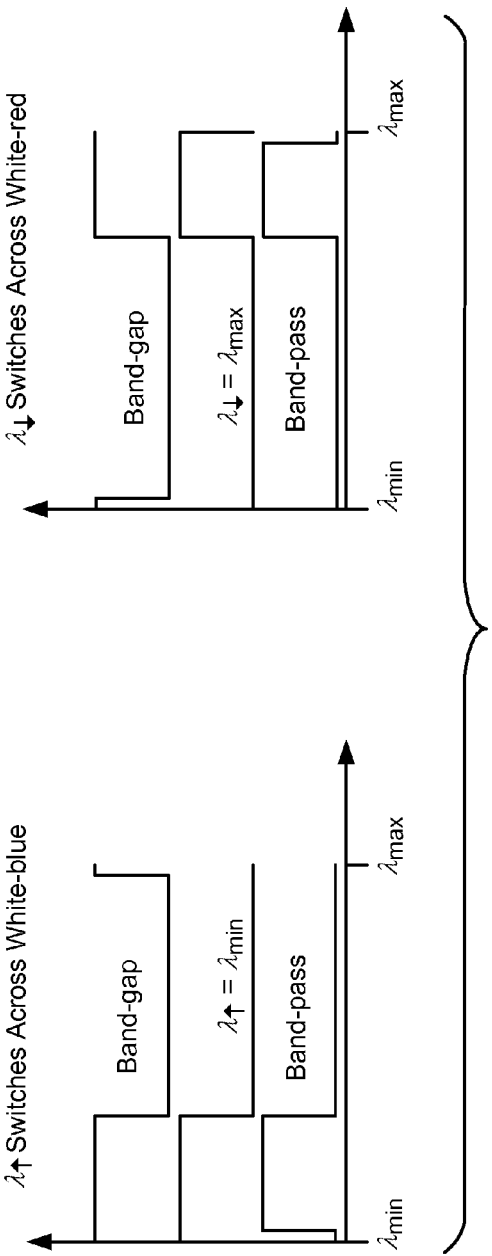
FIG. 19 depicts the behavior near the boundary between band-pass and band-gap spectra.

Referring now to FIG. 19, the white-red and white-blue boundary segments of FIG. 2 are where $\lambda_\uparrow$ or $\lambda_\downarrow$ fall on the $\lambda_{min}/\lambda_{max}$ boundary. The white-red boundary is where $\lambda_\downarrow$ falls on $\lambda_{max}$, and the white-blue boundary is where $\lambda_\uparrow$ falls on $\lambda_{min}$.

Figure 20B:
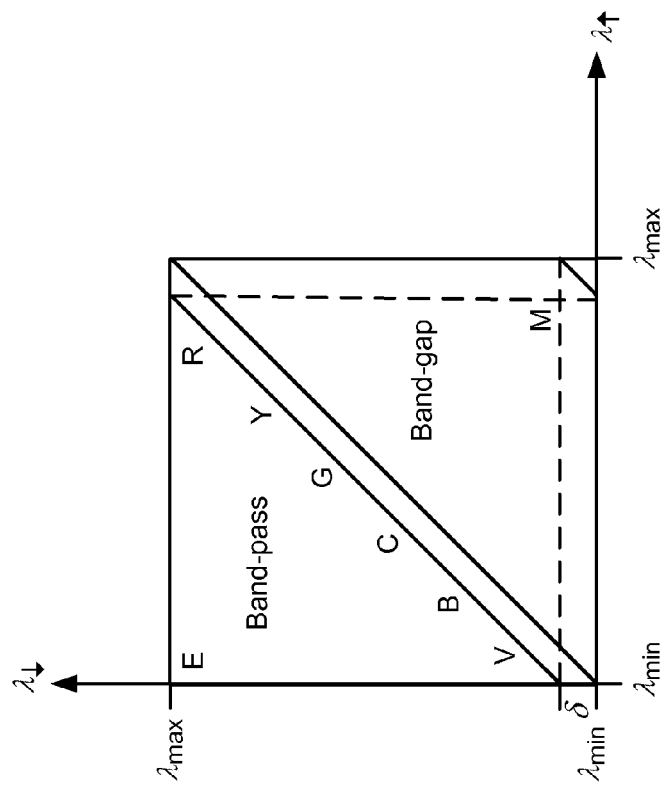
FIGS. 20A and 20B depict colors for rectangular spectra represented in a $[\lambda_\uparrow, \lambda_\downarrow]$ plane.
Figure 20A:
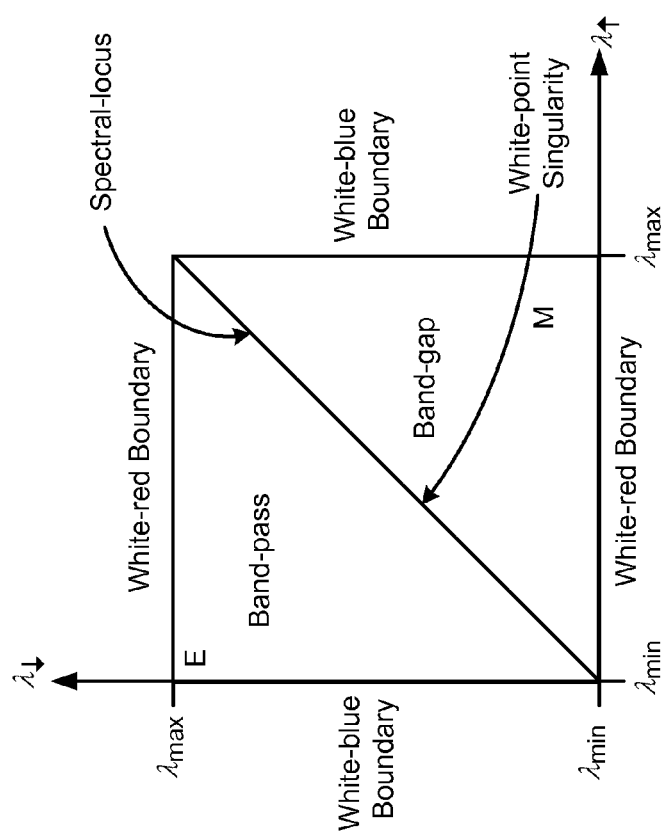

It is illustrative to see how the (x,y) solution space for band-pass and band-gap spectra depicted in FIG. 2 maps into the domain in [$\lambda_\uparrow,\lambda_\downarrow$] space depicted in FIGS. 20A and 20B.

An equal energy white point E is where $\lambda_\uparrow=\lambda_{min}$ and $\lambda_\downarrow=\lambda_{max}$. The diagonal line is on the spectral local if approached from the band-pass side or near the white-point if approached from the band-gap side. The upper triangular region for band-pass spectra is a closed set (it includes its boundary) while the triangular region for band-gap spectra is open (it does not include its boundary). FIG. 15B depicts the trajectory in the two-dimensional $\lambda$-space of relatively narrow-band spectra of bandwidth $\delta$ and a center frequency that traverses the circular lambda domain. As the center frequency goes from $\lambda_{min}+\delta/2$ to $\lambda_{max}-\delta/2$, the hues pass through violet (V), blue (B), cyan (C), green (G), yellow (Y) and red (R). When the center frequency is within $\delta/2$ of [$\lambda_{min}, \lambda_{max}$] the hue passes through magenta.

The invention claimed is:

1. A spectral synthesis module to generate color output signals in response to image capture device sensor outputs, the spectral synthesis module comprising:
an input module to receive image capture device sensor outputs (1515A); the image capture device sensor outputs being a result of an input spectrum of an image being applied to corresponding image capture device spectral sensitivities of an image capture device (1710);
a processing module (1500E) to divide two of the image capture device sensor outputs by a first scale factor ($\Sigma$); wherein the first scale factor comprises the sum of all of the image capture device sensor outputs;
a first two-dimensional look-up table (2-D LUT) (1510C) to map results of the dividing to determine a first wavelength and a second wavelength; wherein the first wavelength comprises a wavelength where a substantially rectangular spectral representation transitions from zero to a second scale factor (I) and the second wavelength comprises a wavelength where the substantially rectangular spectral representation transitions from the second scale factor value to zero; wherein the second scale factor comprises a ratio of the first scale factor divided by a circular integral of the sum of the image capture device spectral sensitivities of the image capture device (1710);
a second 2-D LUT (1510E) to map the first wavelength and the second wavelength to a first set of color output signals; and
a multiplier (1540E) to multiply the first set of color output signals with the first scale factor to output a second set of color output signals.

2. The spectral synthesis module of claim 1, wherein the first 2-D LUT (1510C) and the second 2-D LUT (1510E) are combined into a third 2-D LUT (1510F), wherein the third 2-D LUT maps the results of the dividing to determine the first set of color output signals.

3. The spectral synthesis module of claim 2, wherein values of the third 2-D LUT are determined in response to a best fit method, the best fit method minimizing according to a distance criterion the distance between the output of the third 2-D LUT and a test set of color output signals.

4. The spectral synthesis module of claim 3, wherein the distance criterion is the mean-square error criterion.

5. A spectral synthesis module to generate color output signals in response to image capture device sensor outputs, the spectral synthesis module comprising:
- an input module to receive image capture device sensor outputs (1515A); the image capture device sensor outputs being a result of an input spectrum of an image being applied to corresponding image capture device spectral sensitivities of an image capture device (1710);
- a processing module (1500E) to divide two of the image capture device sensor outputs by a first scale factor ($\Sigma$), wherein the first scale factor comprises the sum of all of the image capture device sensor outputs;
- a two-dimensional look-up table (2-D LUT) (1510F) to map results of the dividing to determine a first set of color output signals, wherein values of the 2-D LUT are determined in response to a best fit method, the best fit method minimizing according to a distance criterion the distance between the output of the 2-D LUT and a test set of color output signals; and
- a multiplier (1540E) to multiply the first set of color output signals with the first scale factor to output a second set of color output signals.

6. The spectral synthesis module of claim 5, wherein the distance criterion is the mean-square error criterion.

7. A tangible computer-readable medium containing a set of instructions that causes a computer to perform operations comprising:
- accessing image capture device sensor outputs (1515A); the image capture device sensor outputs being a result of an input spectrum of an image being applied to corresponding image capture device spectral sensitivities of an image capture device;
- dividing two of the image capture device sensor outputs by a first scale factor ($\Sigma$), wherein the first scale factor comprises the sum of all of the image capture device sensor outputs;
- mapping using a two-dimensional look-up table (2-D LUT) (1510F) the results of the dividing to determine a first set of color output signals, wherein values of the 2-D LUT are determined in response to a best fit method, the best fit method minimizing according to a distance criterion the distance between the output of the 2-D LUT and a test set of color output signals; and
- multiplying the first set of color output signals with the first scale factor to output a second set of color output signals.

* * * * *